US012739070B2

(12) United States Patent
Agarwal et al.

(10) Patent No.: US 12,739,070 B2
(45) Date of Patent: Sep. 15, 2026

(54) METHODS AND APPARATUS TO PERFORM SHORT-RANGE WIRELESS COMMUNICATION

(71) Applicant: Intel Corporation, Santa Clara, CA (US)

(72) Inventors: Anshu Agarwal, Bangalore (IN); Kaushal Billore, Bangalore (IN); Suranjan Chakraborty, Bangalore (IN); Amit Singh Chandel, Bangalore (IN); Prasanna Desai, Elfin Forest, CA (US); Chandrashekar Gowda, Bangalore (IN); Vishal Dhull, Bengaluru (IN); Mallari Hanchate, Bangalore (IN); Mythili Hegde, Santa Clara (IN); Vishnu K, Bangalore (IN); Srinivas Krovvidi, Thrissur (IN); Naveen Manohar, Bangalore (IN); Mayur Maheshwari, Bangalore (IN); Yogesh Malkhede, Bangalore (IN); Barath C. Petit, Bangalore (IN); Balvinder Pal Singh, Bhilai (IN); Sudhakaran Subramanian, Bangalore (IN); Rahul Tiwari, Bangalore (IN); Padmavathi Tiwari, Bangalore (IN); Divya Lakshmi Saranya Vemuri, Bangalore (IN); Ingolf Karls, Feldkirchen (DE); Ehud Reshef, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 18/475,252

(22) Filed: Sep. 27, 2023

(65) Prior Publication Data

US 2024/0154741 A1 May 9, 2024

(30) Foreign Application Priority Data

Nov. 7, 2022 (EP) .................................... 22205839

(51) Int. Cl.
*H04W 72/54* (2023.01)
*H04L 5/00* (2006.01)
*H04W 72/1263* (2023.01)

(52) U.S. Cl.
CPC ....... *H04L 5/0012* (2013.01); *H04W 72/1263* (2013.01); *H04W 72/54* (2023.01)

(58) Field of Classification Search
None
See application file for complete search history.

(56) References Cited

U.S. PATENT DOCUMENTS 6,240,125 B1 5/2001 Andersson et al.
6,501,785 B1 * 12/2002 Chang .................. H04W 16/10 375/133

(Continued)

FOREIGN PATENT DOCUMENTS

CN 113037327 A 6/2021

OTHER PUBLICATIONS

European Search Report issued for the corresponding EP patent application No. EP 22205839, dated Mar. 28, 2023, 7 pages (For informational purposes only).

*Primary Examiner* — Anh Vu H Ly
(74) *Attorney, Agent, or Firm* — Viering, Jentschura & Partner mbB

(57) ABSTRACT

An apparatus for a communication device, the apparatus may include a processor configured to: obtain channel metrics for a plurality of radio communication channels, each obtained channel metric is associated with a respective radio communication channel of the plurality of radio communication channels, generate a plurality of channel hop- (Continued)

ping sequences, each channel hopping sequence is representative of an allocation of the plurality of radio communication channels for a plurality of time slots, wherein a number of time slots allocated for each radio communication channel within each channel hopping sequence is based on the respective obtained channel metric, and select one of the plurality of channel hopping sequences based on a predefined criterion to communicate with a further communication device.

19 Claims, 11 Drawing Sheets

(56) References Cited

U.S. PATENT DOCUMENTS

| | | | | |
|---|---|---|---|---|
| 7,957,451 | B1 * | 6/2011 | Baugh | H04B 1/7143<br>375/132 |
| 2011/0255570 | A1 * | 10/2011 | Fujiwara | H04B 1/7143<br>375/E1.033 |
| 2017/0126275 | A1 * | 5/2017 | Kwon | H04B 1/715 |
| 2019/0222256 | A1 | 7/2019 | Nammi | |
| 2023/0353191 | A1 * | 11/2023 | Lee | G06F 3/03543 |

* cited by examiner

| RF1 | RF3 | RF2 | RF4 | RF1 | RF5 | RF2 | RF3 | RF1 | RF4 | RF2 | RF5 | 701 |
|---|---|---|---|---|---|---|---|---|---|---|---|---|
| RF2 | RF3 | RF1 | RF4 | RF2 | RF5 | RF1 | RF3 | RF2 | RF4 | RF1 | RF5 | 702 |

App 1501

Host #1 1502

BT Controller #1 1503

BT Controller #2 1504

Host #2 1505

1511

Mute Ind. to Host

1512

BT HFP Profile AT + VGM

1514

Silence Data

1515

Silence

Update Controller

1513

1516

Toggled Flow Bit | Mute

Null Packet

1517

1521

Unmute Ind. to Host

1523

Toggled Flow Bit | No Mute

Update Controller

1522

1524

Silence

BT HFP Profile AT + VGM

1525

1531

Audio Input

Audio

1532

METHODS AND APPARATUS TO PERFORM SHORT-RANGE WIRELESS COMMUNICATION

CROSS-REFERENCE TO RELATED APPLICATIONS

This application claims priority to European Patent Application EP 22 205 839.8, filed on Nov. 7, 2022, the entire contents of which are incorporated herein by reference.

TECHNICAL FIELD

This disclosure generally relates to methods and apparatus to perform short-range wireless communication.

BACKGROUND

Many wireless communication technologies, in particular, short-range wireless communication technologies (e.g. Bluetooth, Wi-Fi Direct) may allow direct communication between two communication devices using established short-range wireless communication links. In consideration of various use cases for a device that is capable communication via short-range wireless communication technologies, it may be desirable to increase effectiveness of the use of respective RF spectrum by employing various techniques to determine channel hopping sequences. It may further be desirable to provide an audio muting technique for devices communicating via a synchronous communication link. It may further be desirable to employ various functions for visually impaired users.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
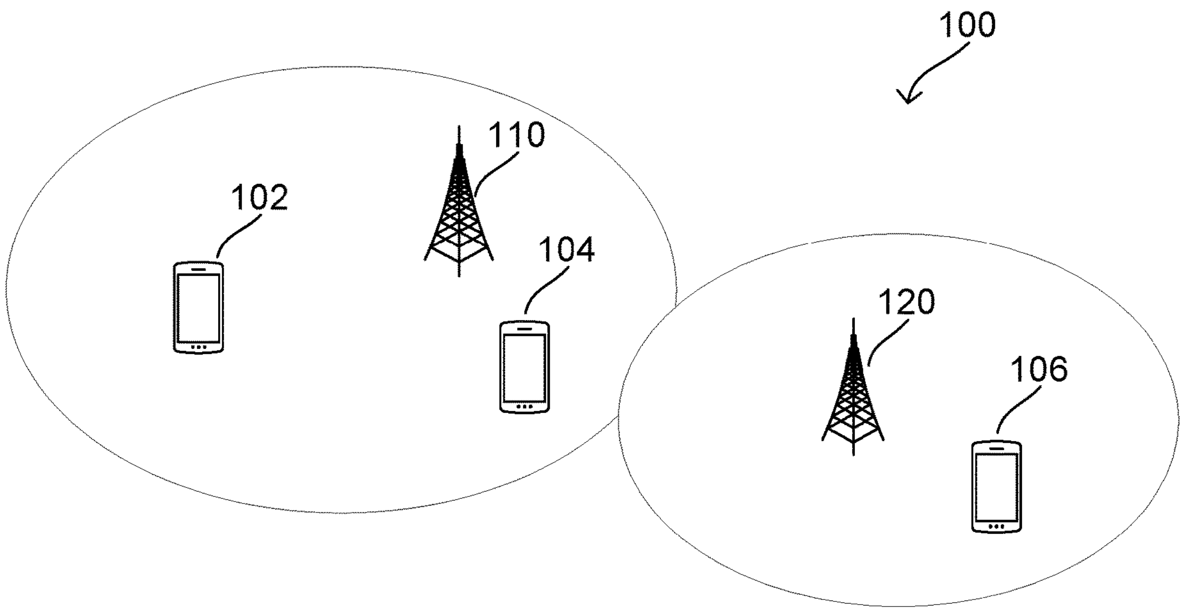
FIG. 1 shows an exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception are handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

As used herein, "communication device" may refer to any type of electronic devices that are able to exchange information with at least another device, for example according to various types of radio communication technologies and using various types of communication protocols as exemplarily provided herein. Exemplarily, a communication device may be, or may include, an access point, a station, any types of user devices which may include a suitable device including a processor, that may include, a mobile device or a non-mobile device, a user equipment (UE), a computing device, such as a personal computer (PC), a desktop computer, a mobile computer, a laptop computer, a notebook computer, a tablet computer, a server, a handheld computing device, a wearable device, such as a smart bracelet, a smart watch, smart glasses, a smart ring, etc., an internet of things (IoT) device, a sensor, a mobile phone, a cellular telephone, any types of wireless accessories, such as a headphone, a headset, a microphone, a speaker, a domotics (smart home) device, a docking station, a medical device, an endoscope, a surgical robot, a hearing aid, a cochlear implant device or a system, a Bluetooth medical device, an audio communication device, a headset, a headphone, an earphone, an earbud, a true wireless earphone, a wireless speaker, an in-vehicle device, or a device for vehicles, etc.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.1 lad, IEEE 802.11ay, etc.), technologies operating above 300 GHz and THz bands, (3GPP/LTE based or IEEE 802.11p and other) Vehicle-to- Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies including Wireless Personal Area Network (WPAN) standards (e.g., according to any IEEE 802.15 standard), Wi-Fi Direct, Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Bluetooth (BT) technology may use frequencies between 2.402 and 2.480 GHz, or 2.400 and 2.4835 GHz including guard bands 2 MHz wide at the bottom end and 3.5 MHz wide at the top, according to frequency-hopping spread spectrum. A communication device operating according to a Bluetooth protocol may divide data to be transmitted into packets, and transmit each packet into a channel designated for the use (e.g. of bandwidth of 1 MHz for classic Bluetooth and 2 MHz for Bluetooth Low Energy (BLE)). A communication device configured to operate according to a Bluetooth protocol may operate in a basic rate (BR) mode using a Gaussian frequency-shift keying (GFSK) modulation, and/or operate in an enhanced data rate (EDR) mode, that is considered to provide a faster data rate and lower power consumption, using a differential phase-shift keying (DISK) (e.g. 8-DPSK) and/or differential quadrature phase-shift keying (DQPSK) (e.g. π/4-DQPSK) based on the quality of the communication channel. A communication device configured to operate according to a Bluetooth protocol may operate according to the Bluetooth Low Energy (BLE) technology that is integrated within the Bluetooth standard starting from v4.0, which operates within the same frequency spectrum, using GFSK modulation.

Wi-Fi Direct technology, which may also be referred to as Wi-Fi P2P, may be one of the exemplary technologies used with respect to peer-to-peer connections provided in this disclosure. Peer-to-peer connections may refer to point-to-point connections between two communication devices according to a peer-to-peer communication protocol. Within a peer-to-peer network, communication devices (two or more) may communicate with each other over the P2P connections established between them. A Wi-Fi Direct connection may allow communication devices to communicate over an established Wi-Fi Direct connection without an intermediary entity such as an access point or a router. Wi-Fi Direct technology allows for forming a P2P network by forming a P2P group in which a communication device may take the role of a Group Owner (GO) or a Group Client (GC).

In accordance with various aspects of this disclosure, a communication device may communicate with at least one further communication device. In some aspects, a short-range wireless communication device may communicate with at least one further short-range wireless communication device over an established short-range wireless communication link. The short-range wireless communication device may have connections that are established with multiple short-range wireless communication devices simultaneously. Various aspects provided herein may include examples in which short-range wireless communication is Bluetooth (BT) communication and accordingly in respective aspects, a short-range wireless connection may include BT connections. Operations may include BT communication in a BR/EDR mode or in a BLE mode.

In some aspects, methods and apparatus may employ channel hopping mechanisms with an intention to reduce interference and fading by using a number of frequency hopping spread spectrum carriers. In those aspects, connected communication devices may communicate with each other according to a determined channel hopping pattern. In existing channel hopping mechanisms, one of the communication devices may determine the channel hopping patterns randomly (e.g. frequency hopping in BT), or pseudo-randomly based on certain considerations (e.g. adaptive frequency hopping in BT). It may be desirable for the respective communication device to determine a channel hopping pattern to be used with another communication device according to a designated scheduling mechanism by scheduling channels having better quality more frequently.

In some aspects, methods and apparatus may employ various configuration mechanisms associated with established synchronous links in BT, particularly for audio connections in some examples, with an intention to reduce power consumption and use of the allocated spectrum efficiently, which may further reduce interference for other BT devices within the same environment.

In some aspects, methods and apparatus may employ various accessibility mechanisms with an intention to improve accessibility of a computing device for visually impaired users. It may be desirable for a computing device to operate in a designated mode with an improved accessibility over an established interface between a designated input device and applications, and in some aspects in designated low power operation modes with an intention to conserve power.

Figure 2:
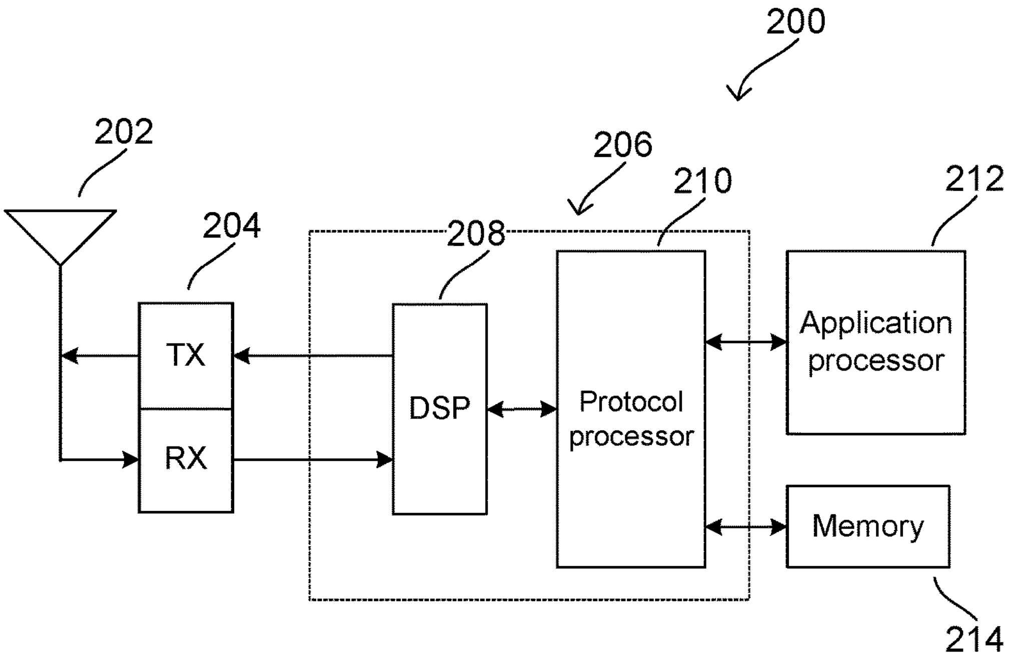
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include communication devices depicted as terminal devices 102, 104, and 106 and communication devices depicted as network access node 110. Radio communication network 100 may communicate with terminal devices 102 and 104 via network access node 110 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. In various examples, terminal devices 102 and 104 may communicate with each other without involvement of the radio access network, such as over a peer-to-peer network.

In an exemplary cellular context, network access node 110 may be base stations (e.g., eNodeBs, NodeBs, Base Transceiver Stations (BTSs), gNodeBs, or any other type of base station), while terminal devices 102, 104 and 106 may be cellular terminal devices (e.g., Mobile Stations (MSs), User Equipments (UEs), or any type of cellular terminal device). Network access node 110 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. Terminal devices 102 and 104 may exemplarily be terminal devices within the same vicinity (in proximity). The cellular core network may interface with one or more external data networks. In an exemplary short-range wireless context other than BT, network access node 110 and 120 may be access points (APs, e.g., WLAN or WiFi APs), while terminal device 102 and 104 may be short range terminal devices (e.g., stations (STAs)). Network access node 110 may interface (e.g., via an internal or external router) with one or more external data networks. Network access node 110 and terminal devices 102 and 104 may include one or multiple transmission/reception points (TRPs). In an exemplarily BT network, network access node 110 and 120 may be a primary device of the BT network (e.g. piconet) and terminal devices 102 and 104 may be a secondary device of the BT network.

Network access node 110 (and, optionally, other network access nodes of radio communication network 100 not explicitly shown in FIG. 1) may accordingly provide a radio access network to terminal devices 102, 104, and 106 (and, optionally, other terminal devices of radio communication network 100 not explicitly shown in FIG. 1). In an exemplary cellular context, the radio access network provided by network access node 110 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access node 110 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access node 110 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device. The communication device may include a terminal device 102 according to some aspects, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
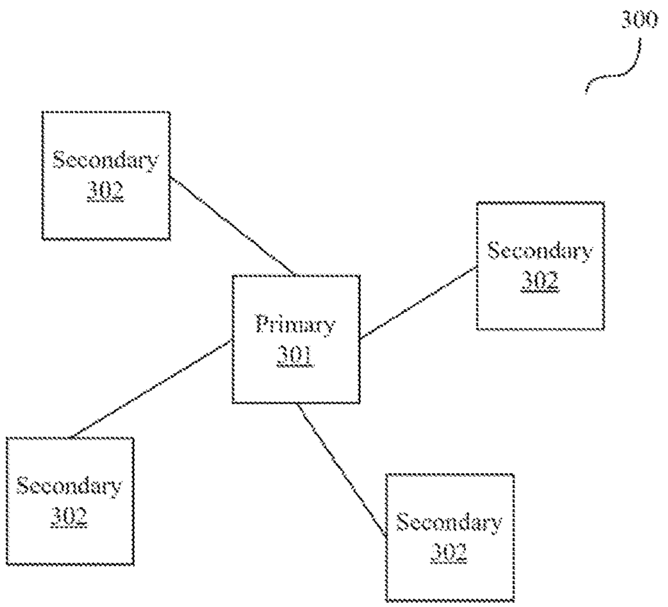
FIG. 3 shows an exemplary illustration of a network topology that communication devices may use.

FIG. 3 shows an exemplary illustration of a network topology that communication devices may use. Communication devices may be configured to communicate within a network 300 (e.g. piconet for BT networks). Each communication device may undertake various roles within the network. For example, a communication device may operate as a primary device 301 (e.g. master device, central device) or a secondary device 302 (e.g. slave device, peripheral device). A primary device 301 may be a communication device that may initiate a connection request to another communication device that advertises its presence. A secondary device 302 may be a communication device that receives a connection request from a primary device 301.

Each secondary device 302 may be communicatively coupled to the primary device over an established connection, collectively forming the network 300. The primary device 301 may coordinate communication through the network 300. It may be possible for the primary device 301 and the secondary devices 302 to change the roles in-between, such that the primary device 301 may become a secondary device and one of the secondary devices 302 may become a primary device in the network 300 in various examples. In various examples, the primary device 301 may establish and maintain an order and a polling scheme, including designating time slots for the secondary devices 302. The number of secondary devices 302 in the network may vary. Furthermore, the network 300 may be communicatively coupled to another network over at least one of the devices resulting in a scatternet for BT devices. In a scatternet, a device that may be a primary device or a secondary device for one network, may act as a secondary device for another network. In such cases, the device may employ time multiplexing to transmit/send radio communication signals to multiple networks.

In some examples, devices of the network 300 may employ a channel-hopping mechanism (or frequency-hopping mechanism). In a channel-hopping mechanism, available radio resources is divided in multiple radio communication channels (e.g. RF channels or sub-bands), and the transmitting entity and the receiving entity (or entities) may change (i.e. "hop") the carrier frequency in time among many distinct RF channels from the multiple RF channels according to a predetermined order (e.g. "a hop pattern" or a "hop sequence"). Accordingly, even if there is a transmission via an RF channel having considerable interference, the effect of the interference may be limited due to limited use of that particular channel. This mechanism may also be referred to as frequency-hopping spread spectrum.

The communicating entities (i.e. transmitting entity and receiving entity) may have the knowledge of the predetermined order of the hopping, which may be referred to as a channel hopping sequence (or pattern) or a frequency hopping sequence (or pattern) in this disclosure. A channel hopping sequence may represent an allocation of multiple RF channels in multiple time slots. The channel hopping sequence may simply include information representing an order of RF channels to be used, and the respective communicating entity may accordingly change the RF channels based on the provided order according to a predefined time slot. In some examples, the channel hopping sequence may also include time information representing duration of time slots, or representing when the hop is to be performed.

In accordance with various aspects provided herein, a processor may utilize the magnitude of channel health based on a score representing a channel metric associated with a quality of channel to decide channel hopping sequence via an enhanced Pinwheel scheduling algorithm. The pinwheel scheduling may ensure label repeatability at least once in a given repeat time and schedule multiple occurrences of a label within a given repeating time. In some examples, it may be desirable to apply a correction for channels having a quality below a predefined threshold, to ensure that low quality channels are repeated more than once in the given repeating time, its next occurrences are to be repeated by channels with higher quality. The RF channels with lower quality may accordingly be gray listed through the implementation. Furthermore, the density of the pinwheel may be equal or lower tan 0.5 to provide an optional schedule in polynomial time.

Figure 4:
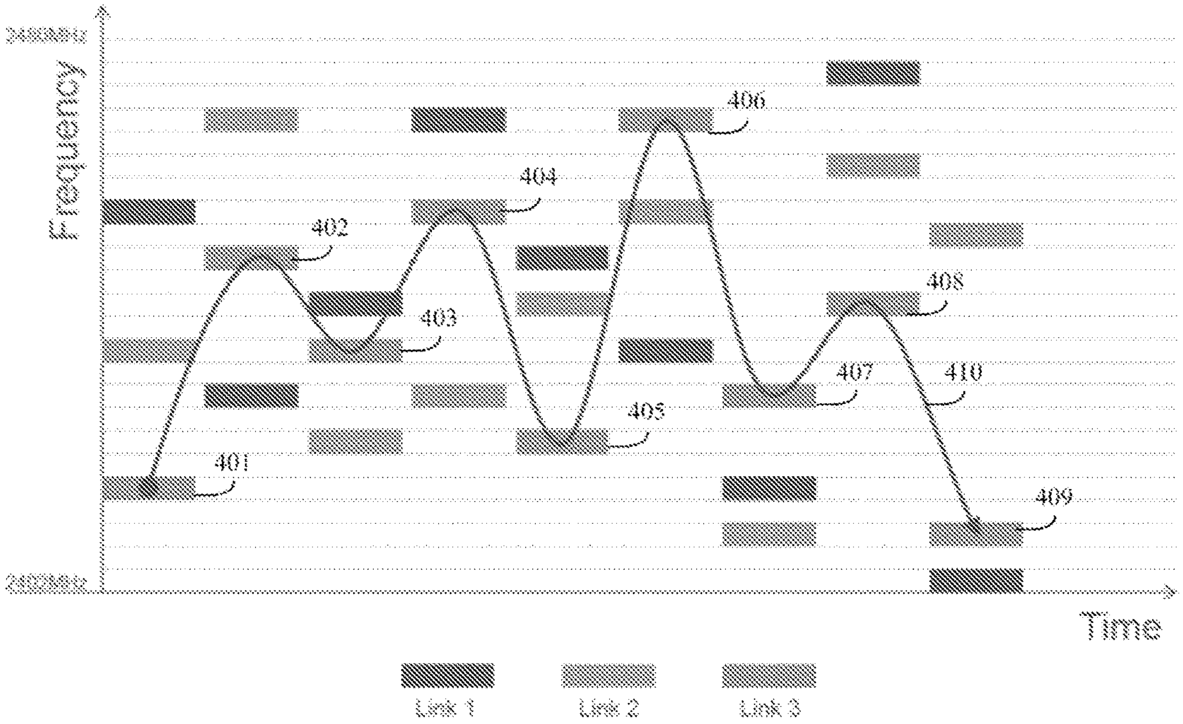
FIG. 4 shows an exemplary illustration of RF channels used by three established links based on a channel hopping mechanism.

FIG. 4 shows an exemplary illustration of RF channels used by three established links based on a channel hopping mechanism. The illustration intends to provide channel hopping example, in particular according to adaptive channel hopping, for BT technology. Accordingly, the available RF spectrum between 2402 MHz and 2480 MHz is divided into multiple RF channels. Assuming that the channel hopping sequence 410 illustrated herein is for communication between a primary device (e.g. the primary device 301) and a secondary device (e.g. the secondary device 302) collectively are to be referred to as devices, the devices may accordingly communicate via a first RF channel at a first time slot 401, then via a second RF channel at a second time slot 402, then via a third RF channel at a third time slot 403, and so on for all illustrated time slot and RF channel pairs 404, 405, 406, 407, 408, 409.

For a group of communicating devices, the operation may, in addition to the designated channel hopping sequence 410, include synchronization according to a common clock. The primary device may provide the synchronization reference, and the secondary devices that are configured to communicate with the primary device may follow their designated hopping pattern according to the provided synchronization reference. The BT technology mainly supports a first hopping mechanism (e.g. a basic hopping pattern, BFH) in which 79 RF channels in BR/EDR or 37 RF channels in LE, and pseudo-randomly ordered, and a second hopping mechanism (e.g. an adaptive hopping pattern, AFH), which the primary device may adapt, for each secondary device, by excluding a subset of frequencies from the pseudo-random ordering. Many aspects of channel hopping mechanisms are similar for BR/EDR and LE and aspects provided herein are applicable, in general, for both BR/EDR or LE, unless explicitly indicated otherwise. Furthermore, while the devices changing the RF channels, logical links are maintained to provide flow of data between the devices.

For AFH in BR/EDR, a primary device may select RF channels pseudo-randomly from the available RF channel list, where all RF channels in a channel map are given near equal priority. In most implementations, the primary device may identify good and bad RF channels, and the primary device may exclude the bad channels completely from the availability list by blacklisting them, or in other words, the primary device may select RF channel only from good RF channels. Such approach may result in underutilization of available RF spectrum which may also be a potential problem while enabling Multiple BLE connections. BFH/AFH, in general, do not allow ranking of RF channels within the channel map. RF channels are simply associated with a binary option, namely good or bad, and quality of RF channels respectively is usually not taken into consideration while deciding the hopping sequence. Thus, it may be desirable to implement a channel hopping mechanism which may be also optimal for supporting Multi BLE connections.

In order to distinguish "good RF channels" and "bad RF channels", the primary device may obtain a channel map (e.g. AFH_channel_map information). The obtained channel map is representative of which RF channels are to be used, and/or which RF channels are to be unused. In order to generate the channel map, the devices may individually determine whether an RF channel is classified as a good channel or a bad channel based on local information, such as using a channel assessment method or via a received HCl). The secondary devices may provide information representing their determinations to the primary device.

Figure 5:
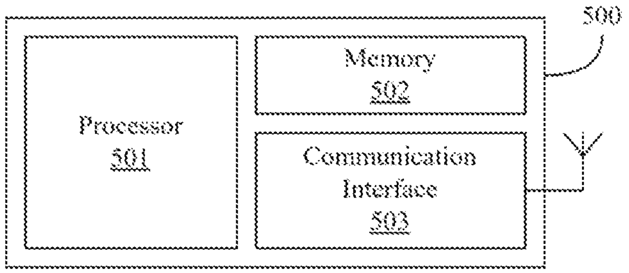
FIG. 5 shows an exemplary apparatus for a communication device.

FIG. 5 shows an exemplary apparatus for a communication device. The apparatus 500 may include a processor 501. The processor 501 may include a central processing unit, a graphics processing unit, a hardware acceleration unit, a neuromorphic chip, and/or a controller. The processor 501 may be implemented in one processing unit, e.g. a system on chip (SOC), or an integrated system or chip. The processor 501 may include more than one processing unit configured to provide various aspects as mentioned herein. In various examples, the communication may include the apparatus 500, and the processor 501 may be one or more processors of the communication device (e.g. application processor 212 and optionally protocol processor 210 and digital signal processor 208 as exemplarily provided with respect to FIG. 2).

The apparatus 500 may further include a memory 502 to store data. The memory 502 may store an operating system (not shown) including instructions configured to manage various operations of the processor 501, the memory 502, and the communication interface 503, and may further manage operations of the communication device. The processor 501 and memory 502 (and also other various components of the apparatus) and other entities may be communicatively coupled over an internal interface to communicate with each other (e.g. a bus, wires, etc.).

The communication interface 503 may cause the apparatus 500 to communicate with further devices (e.g. other communication devices), and accordingly the processor 501 may manage the communications with other communication devices for the communication device 500. The communication interface 503 various components, as exemplarily provided in accordance with FIG. 2, such as antenna system 202, radio frequency (RF) transceiver 204, baseband modem 206 (including digital signal processor 208 and protocol controller 210).

In various examples, the communication interface 503 may be configured to transmit and/or receive radio communication signals, via one or more antennas, according to BT communication protocol. The communication interface 503 may include a separate application processor, and memory, or in various examples, the processor 501 and the memory 502 may provide functions of an application processor and memory for communication purposes for the BT communication protocol. The communication interface 503 may further be configured to perform communications according to another communication protocol. Accordingly, the communication interface 503 may include multiple transceivers, each transceiver being configured to operate for a particular radio communication protocol.

In some aspects, the communication interface 503 may be configured to perform channel measurements of designated RF channels to obtain channel metrics. The communication interface 503 may include a measurement circuit configured to measure received radio communication channels. Based on the measured radio communication channels, the processor 501 may determine, and accordingly obtain, channel metrics for the measured radio communication channels. Furthermore, the processor 501 may obtain channel metrics for one, some, or all available RF channels from a further communication device, which the communication device may communicate. In an example of BT communication, and the communication device being a primary BT device, the processor 501 may receive channel quality information from secondary BT devices, with which the primary BT device may have established connections.

Each obtained channel metric may represent a quality of an RF channel of a plurality of RF channels. In some examples, the processor 501 may obtain channel metrics for the plurality of RF channels as an obtained channel map (e.g. AFH_channel_map). In some examples, the obtained channel metric may represent the quality of each RF channel in a non-binary manner, exemplarily with at least three levels designated to represent the channel quality. In some examples, the processor 501 may perform calculations to determine channel metrics for respective RF channels based on at least one of a signal to noise ratio (SNR), an estimated or measured received signal strength indication (RSSI), an estimated or measured packet error rate (PER) or a bit error rate (BER), other co-existing radio access technologies (RATs), an estimated network traffic classification, an estimated or measured QoS metric, of or associated with the respective channel. The processor 501 may calculate each channel metric based on a predefined mapping operation including one, all, or a combination of these parameters.

The processor 501 may, based on the obtained channel metrics, determine a channel hopping sequence to be used by the communication device to communicate with a further communication device. Accordingly, with the determination of the channel hopping sequence based on the obtained channel metrics that are not binary, the allocation of RF channels into a number of time slots (i.e. scheduling) may provide a more efficient use of available RF spectrum, namely the plurality of RF channels in an example.

The processor 501 may, based on the obtained channel metrics, determine the channel hopping sequence according to a designated pinwheel scheduling algorithm to allocate RF channels selected from the available RF spectrum into the number of time slots. In a general context, the pinwheel scheduling problem is a problem in real-time scheduling with repeating tasks of unit length and hard constraints on the time between repetitions.

For this purpose, the processor 501 may, for each RF channel, determine a repeat time (i.e. time or number of time slots between two occurrences) based on obtained channel metric representing channel quality of the respective RF channel. The processor 501 may employ a quantization scheme (e.g. by obtaining a quantized repeat time for each RF channel or obtaining a repeat time for each RF channel based on a quantized channel metric) to determine the repeat times for the plurality of RF channels, considering that the number of RF channels and repeat times in a wide variety may be challenging to calculate. The processor 501 may then input the repeat times calculated for the plurality of RF channels to be allocated in the channel hopping sequence into the pinwheel scheduling algorithm.

Figure 6:
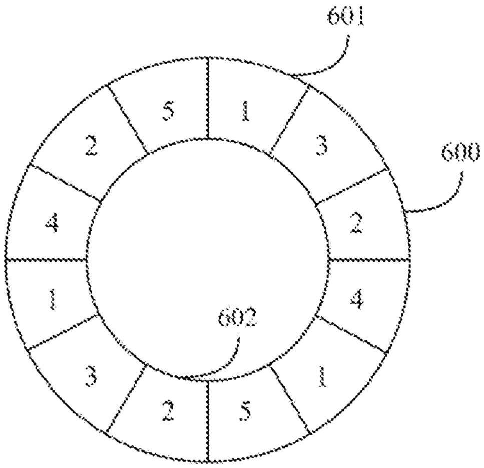
FIG. 6 shows an exemplary illustration of a result of pinwheel scheduling algorithm.

FIG. 6 shows an exemplary illustration of a result of pinwheel scheduling algorithm. Let A be a list of "n" positive integers. A pinwheel schedule for A would be an infinite sequence drawn over {1, 2, . . . , n} such that each element of this sequence occurs at least once in window of $a_i$ consecutive positions, $a_i$ being an integer. If such a schedule exists for A, then A is schedulable via a pinwheel schedule of length $$\leq \prod_{i=1}^{n} a_i.$$

Without loss of generality, and assuming that elements in A follow a nondecreasing order, the value $$\sum_{i=1}^{n} 1/a_i$$

is the density of a, denoted as d(a). A necessary condition for being schedulable may include having density d(a) at most 1.0. Instances with a density of over 1.0 are never schedulable. The cyclic schedule 600 illustrates output of a predefined pinwheel scheduling algorithm for an input A={4, 4, 6, 6, 6} that is representative of repeat times for task indices 1, 2, 3, 4, 5. A processor (e.g. the processor 501) may determine a channel hopping sequence based on a pinwheel scheduling algorithm, in which each available RF channel correspond to a task and respective repeat times (i.e. time period between a first occurrence and a second occurrence of respective RF channel in the schedule) that are calculated based on respective obtained channel metric associated with the respective RF channel.

Referring back to FIG. 5, the processor 501 may determine the channel hopping sequence by allocating the plurality of RF channels into a predetermined or a predefined plurality of time slots, in which the minimum repeat time for each scheduled RF channel (i.e. the time period of the number of time slots between first occurrence of the respective scheduled RF channel and the second occurrence of the respective scheduled RF channel) is based on obtained channel metric for the respective RF channel. In other words, the determined channel hopping sequence for a plurality of time slots may include each scheduled RF channel of the plurality of RF channels for a number of times that is based on the obtained channel metric for the respective RF channel.

In some aspects, the processor 501 may perform the allocation of the plurality of RF channels into a plurality of time slots into a cyclic schedule, such that constraints associated with the minimum repeat times are always kept as long as the obtained cyclic schedule is repeated. Furthermore, the processor 501 may select any one of RF channels as to be scheduled within the first actual time slot, as long as the cyclic schedule is followed. The processor 501 may perform a pinwheel scheduling that is configured to schedule the plurality of RF channels as tasks into a plurality of time slots, in which repeat time for each task (i.e. each RF channel) is set based on obtained channel metric for the respective RF channel.

In an illustrative an simple example, assuming that obtained channel metrics for RF channels 1, 2, 3, 4, and 5 are represented by values {4, 4, 6, 6, 6} respectively, in a representation that a lower value represents a better channel quality, the illustrated cyclic schedule 600 may illustrate the cyclic schedule in which the number of allocated time slots for each RF channel is based on the obtained channel metric for the respective RF channel. The processor may obtain the cyclic schedule by using the pinwheel scheduling algorithm.

As can be seen from the illustrated cyclic schedule 600, a selection of an RF channel for the entry point (i.e. first RF channel that is to be allocated at the first time slot to be scheduled) to the obtained cyclic schedule is arbitrary for keeping constraints associated with repeat times for the RF channels, and the obtained cyclic schedule can be scheduled infinitely.

The processor 501 may accordingly generate a plurality of channel hopping sequences based on the obtained cyclic schedule. In one example, each generated channel hopping sequence may represent an allocation of the plurality of RF channels into a plurality of time slots, wherein a number of time slots allocated for each RF channel of the plurality of RF channels within each channel hopping sequence is based on the obtained metric of the respective RF channel. In one example, the processor 501 may generate a plurality of channel hopping sequences from the obtained cyclic schedule by selecting, for each channel hopping sequence, one of time slots as an entry point (i.e. first scheduled time slot) and populating other time slots, for the respective channel hopping sequence, according to the order provided by the obtained cyclic schedule.

Figure 7:
FIG. 7 shows an illustration of exemplary generated two channel hopping sequences according to an obtained cyclic schedule.

FIG. 7 shows an illustration of exemplary generated two channel hopping sequences according to an obtained cyclic schedule. In this illustrative example, a processor (e.g. the processor 501) may have obtained a cyclic schedule (e.g. the cyclic schedule 600) representing a cyclic order of a plurality of RF channels (e.g. RF-1,2,3,4,5) into multiple time slots. Based on the obtained cyclic schedule, the processor may determine to select the slot 601 as the first slot of a first channel hopping sequence 701. Accordingly, the first channel hopping sequence is representative of an order provided by the cyclic schedule starting from the slot 601. Similarly, based on the obtained cyclic schedule, the processor may determine to select the slot 602 as the first slot of a second channel hopping sequence 702. Accordingly, the second channel hopping sequence is representative of an order provided by the cyclic schedule starting from the slot 602.

Referring back to FIG. 5, in some examples, the processor 501 may remap at least one of the time slots within a generated channel hopping sequence based on the obtained channel metric of the respective RF channel allocated for the respective time slot. For example, the processor 501 may remap RF channels associated with channel metrics representative of low channel quality. The processor 501 may determine whether an obtained channel metric for an allocated RF channel is representative of a low channel quality based on a predetermined channel metric threshold. In some aspects, the processor 501 may remap at least one of the time slots within a generated channel hopping sequence from a respective RF channel of which the respective obtained channel metric is representative of a low channel quality to another RF channel from the plurality of RF channels of which the respective obtained channel metric is representative of a high channel quality. Such channel hopping sequences including remapped time slots may also be referred to as a generated channel hopping sequence herein.

Furthermore, the processor 501 may select one of the generated channel hopping sequences from the plurality of generated hopping sequences that are based on the obtained channel metrics according to a predefined criterion, or predefined criteria. The processor 501 may further configure the communication interface 503 to communicate with the further communication device based on the selected channel hopping sequence. With the selected channel hopping sequence, the processor 501 and the communication interface 503 may cause the communication device to communicate with the further communication device by changing RF channels according to the selected channel hopping sequence. Furthermore, the processor 501 may encode information representing the selected channel sequence for a transmission to the further communication device.

In some examples, the predefined criterion may include a criterion associated with entropies calculated for each generated channel hopping sequence. In other words, the processor 501 may select from the plurality of generated hopping sequences based on calculated entropies for the generated hopping sequences respectively. Exemplarily, the processor 501 may calculate an entropy metric representative of the entropy for a generated channel hopping sequence based on the formula below, in which H denotes the calculated entropy metric for a generated channel hopping sequence $S_i$, $c_j$ may denote an RF channel provided in the sequence $S_i$, and $P(c_j)$ is the probability of the respective RF channel (i.e. a number of time slots allocated by $c_j$ within the sequence $S_i$ over the number of time slots of the sequence $S_i$), m being number of RF channels allocated within the sequence $S_i$:

$$H(S_i) = -\sum_{j=1}^{m} P(c_j)\log(P(c_j))$$

It is to be noted that the processor 501 may use information entropy with the above entropy calculation to quantify the channel hopping nature of the generated channel hopping sequence $S_i$. It is further to be noted that a calculated entropy is configured to be maximized for uniform probability distribution (i.e. the likelihood of each RF channel in a slot is equally probably (1/m)). Accordingly, as the number of hops in a generated channel sequence increases, this would reflect to the calculated entropy as an increased entropy. In adverse channel conditions or for security purposes, it may be desirable to perform channel hopping with a greater number of hops.

In some examples, the predefined criterion may include a criterion associated with estimated throughputs for each generated channel hopping sequences respectively. In other words, the processor 501 may select from the plurality of generated hopping sequences based on estimated throughputs for the generated hopping sequences respectively. Exemplarily, the processor 501 may calculate a throughput metric representative of a metric associated with expected throughput for a generated hopping sequence based on the formula below, in which T denotes the calculated throughput metric, PER being an estimated or expected throughput metric (i.e. packet error rate) associated with ($s_j$) denoting a time slot j of m time slots of a generated channel sequence:

$$T(S_i) = \left(\sum_{j=1}^{m} (1 - PER(s_j))\right) / m$$

In some examples, the predefined criterion may be based on both estimated throughputs and entropy for each generated channel hopping sequence. For example, the predefined criterion may be based on a weighed combination of the entropy metric and the throughput metric. In such an example, the processor 501 may calculate, for each generated channel hopping sequence, the decision metric M using the formula $M(S_i)=\propto T(S_i)+(1-\propto)H(S_i)$; $\propto$ being a predefined or predetermined weight, and select, exemplarily, the generated channel hopping sequence which has returned the best value (e.g. maximum).

In various examples, the communication device may be configured to communicate with multiple further communication devices. Accordingly, the processor 501 may be configured to determine a channel hopping sequence for each further communication device. For this purpose, the processor 501 may be configured to perform above-mentioned operations, for each further communication device, for a selected plurality of RF channels from the available RF spectrum. Accordingly, for each determination of channel hopping sequence for a particular further communication device, the plurality of RF channels may be the selected plurality of RF channels from the available RF spectrum. In some aspects, selected RF channels for one of the further communication devices do not overlap with selected RF channels for other further communication devices. In other words, the processor 501 may select a subset of RF channels for each further communication device, such that none of RF channels are selected for more than one further communication device.

Figure 8:
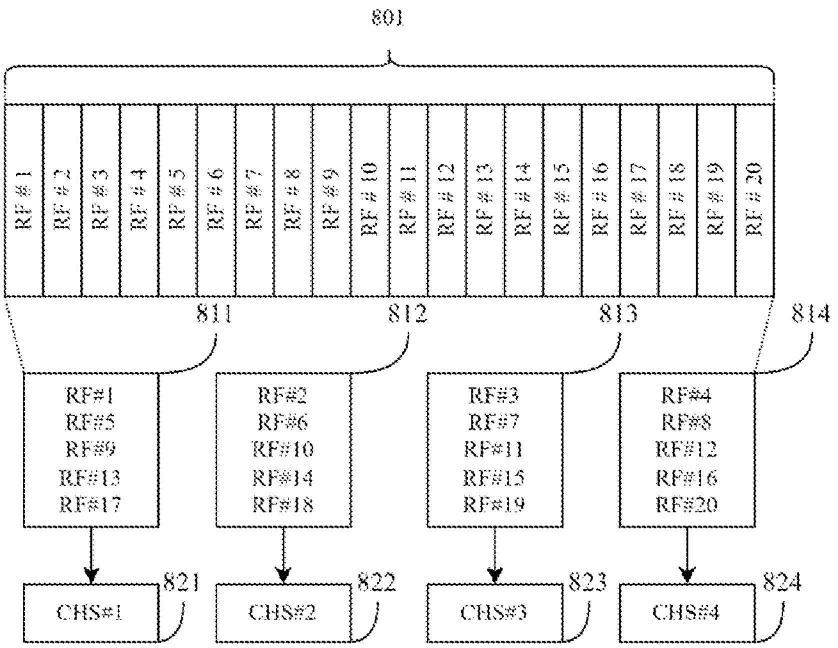
FIG. 8 shows an exemplary illustration of a determination of channel hopping sequences for multiple further communication devices.

FIG. 8 shows an exemplary illustration of a determination of channel hopping sequences for multiple further communication devices. A processor (e.g. the processor) may be configured to determine channel hopping sequences to communicate with multiple further communication devices from a plurality of available RF channels 801. The plurality of available RF channels 801 may correspond to available RF spectrum for that particular communication technology, or it may be a subset of available RF spectrum.

In this illustrative example, the plurality of available RF channels 801 include 20 RF channels indexed as RF #1~RF #20. For a first further communication device the processor may select a first subset of RF channels 811 including RF #1, RF #5, RF #9, RF #13, and RF #17. The processor may 811 accordingly determine from the first subset of RF channels 811 a channel hopping sequence 821 to be used to communicate with the first further communication device. For a second further communication device the processor may select a second subset of RF channels 812 including RF #2, RF #6, RF #10, RF #14, and RF #18. The processor may accordingly determine from the second subset of RF channels 812 a channel hopping sequence 822 to be used to communicate with the second further communication device. For a third further communication device the processor may select a third subset of RF channels 813 including RF #3, RF #7, RF #11, RF #15, and RF #19. The processor may accordingly determine from the third subset of RF channels 813 a channel hopping sequence 823 to be used to communicate with the third further communication device. For a fourth further communication device the processor may select a fourth subset of RF channels 814 including RF #4, RF #8, RF #12, RF #16, and RF #20. The processor may accordingly determine from the fourth subset of RF channels 814 a channel hopping sequence 824 to be used to communicate with the fourth further communication device.

As can be seen from the illustrative example, none of the selected subsets include an RF channel overlapping with another selected subset, although channel overlap between subsets may be present provided that the overlapped RF channels can be scheduled with temporal constraints. Such solution may also be employed by communication devices including multiple transceivers within their communication interface to communicate with multiple further communication devices simultaneously. It is also to be noted that for one established physical connection, multiple channel hopping sequences may be deployed sequentially. Furthermore, in order to obtain hop sequences 821, 822, 823, 824, generated hop sequences can be daisy chained in case of a single connection.

Figure 9:
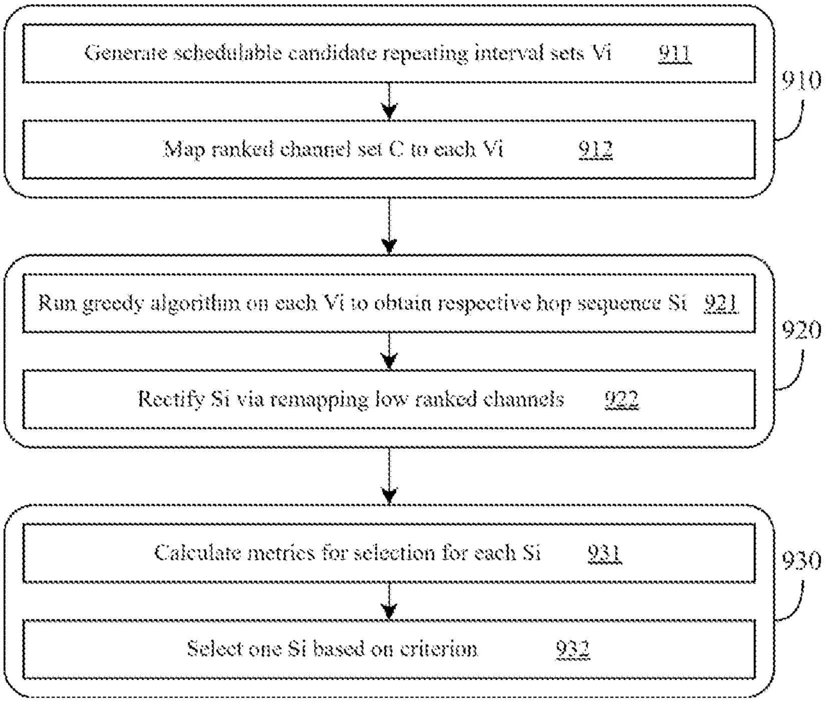
FIG. 9 shows an example of a procedure to determine a channel hopping sequence to be used to communicate with a further communication device.

FIG. 9 shows an example of a procedure to determine a channel hopping sequence to be used to communicate with a further communication device. A processor (e.g. the processor 501) may perform the procedure. The procedure is illustrated to include a first portion 910 in which the processor may generate candidate repeating interval sets $V_i$, i being an index for a candidate repeating interval set, a second portion 920 in which the processor may obtain a channel hopping sequence $S_i$ for each generated repeating interval set $V_i$, and a third portion 930 in which the processor may select one of the obtained channel hopping sequences.

In block 911, the processor may generate a plurality of schedulable candidate repetition interval sets. Each repetition interval (i.e. repeat time) may represent a time duration, or a number of time slots, between two occurrences. Each generated candidate repetition interval set may include a plurality of repetition intervals that are configured as schedulable. At least two of the generated candidate repetition interval sets may include at least different repetition interval. The schedulable criterion for each generated candidate repetition interval set may include that the density of the respective generated candidate repetition interval set is being preferably equal or below 0.5, although density below 1 are also schedulable. The density for a generated candidate repetition interval set "i" including m repetition intervals denoted by v, may be formulated as $$d(V_i) = \sum_{j=1}^{m} (1/v_j).$$

In block 912, the processor may provide a mapping between the generated plurality of schedulable candidate repetition interval sets and a plurality of RF channels selected to be allocated for the respective further communication device, or for the respective channel hopping sequence. The processor may provide the mapping for each RF channel based on obtained channel metric representative of channel quality of the respective RF channel. Accordingly, for each generated candidate repetition interval set, each RF channel may be associated/linked with a repetition interval of the respective generated candidate repetition interval set that is based on the obtained channel metric of the respective RF channel.

In one example, in order to perform operations provided in blocks 911 and 912, the processor may sort the plurality of RF channels based on their obtained channel metrics respectively (e.g. a sorting from the best channel quality to the worst channel quality) thereby obtaining, for the plurality of RF channels including n RF channels, $C=\{c_1, c_2, \ldots, c_n\}$, $c_1$ representing the RF channel with the best quality, and $c_n$ representing the RF channel with the worst quality. Each generated candidate repetition interval set may also include n number of repetition intervals $V_i=\{v_1, v_2, \ldots v_n\}$ which are provided in a non-decreasing order (i.e. each element $v_j$ is equal or above $v_{j-1}$). Accordingly, the processor may provide the mapping such that each $c_j$ is associated with the respective $v_j$. In an example, a generated hopping sequence Si from a generated candidate repetition interval set Vi may be formulated as $g(V_i)=S_i=\{s_{i1}, s_{i2}, \ldots, s_{im}\}$; $m=|S_i|\leq\Pi S_{ij}$.

The processor may perform operations provided according to provided pseudocode below to generate candidate repetition interval sets:

```
NOTE: d(V_i) ≤ 0.5 and |V| = n where d(V_i) = Σ_{j=1}^{n} (1/v_j)

INPUT: n and seed value a >= 3
OUTPUT: Candidate repetition interval set V with v_1 = a and
d(V_1) ≤ 0.5
Start with V_i = {2n, 2n . . . 2n} since d(V_i) = 0.5 for v_j = 2n
for j → 1 to n:
  If j = = 1:
    v_1 = a
```

-continued

```
  Else:
    v_i = b such that b ≥ v_{j-1} and d(V_i) ≤ 0.5
    if no such b exists exit for loop
  Adjust the remaining elements {v_{i+1}, . . . , v_n} to a common
value, such that d(V_i) ≤ 0.5
Return V
```

Accordingly, the processor may generate the plurality of candidate repetition interval sets based on a plurality of different values, such that each seed value may set the highest number of occurrence (i.e. the smallest repetition time). By providing different seed values, the processor may generate different candidate repetition interval sets to be used.

In block 921, the processor may run a simple greedy algorithm on each generated candidate repetition interval set based on obtained channel metrics for the RF channels to generate a channel hopping sequence based on each generated candidate repetition interval set and the mapping that maps each repetition interval within the respective generated candidate repetition interval set to the respective RF channel. Accordingly, the processor may obtain a channel hopping sequence for each generated candidate repetition interval set, in which each RF channel of the plurality of RF channels has a minimum repetition time that is based on the respective repetition interval provided in the respective generated candidate repetition interval set.

In block 922, the processor may further rectify each generated channel hopping sequence to ensure that low ranked RF channels are not scheduled frequently. For this purpose, the processor may remap, for at least one generated channel hopping sequence (i.e. a candidate channel hopping sequence), at least one order that is mapped to an RF channel within the respective generated channel hopping sequence, which the RF channel has an obtained channel metric that is below a predefined or predetermined channel metric threshold, to another RF channel, which the RF channel has an obtained channel metric that is below the predefined, or another predefined, or a predetermined channel metric threshold.

The processor may perform operations provided according to provided pseudocode below to generate a channel hopping sequence $S_i$ from a generated candidate repetition interval set $V_i$:

```
INPUT: Candidate repetition interval set V_i = {v_1,v_2,...., v_n} and ranked channel map C =
{c_1,c_2, ...c_n}
Note: V_i elements in non-decreasing order i.e., v_1 ≤ v_2 ≤....≤v_n) and |V| = |C| =n
OUTPUT: Optimal hop sequence S satisfying V, S = {s_1,s_2,..,s_n} where m = |S| = Πs_j
Initialize 2m empty slots for S
for j → 1 to n :
    k = first available empty slot index
    while k < 2m :
        while slot not empty:
          k = k − 1
      if k > 0:
        s_k = c_j (assign RF channel c_j into time slot s_k)
        k = k + v_j (increment by repetition interval of the RF channel c_j, i.e. v_j)
Remove empty slots in S
Scan S to identify embedded periodic sequence of length m
Rectify S in order to ensure lower scoring channels are not scheduled at a rate greater than 1/
v_j.
Replace these instances with a higher scoring RF channel
Return S
```

In block 931, the processor may calculate selection metrics (e.g. estimated throughput metrics, entropy metrics, or a combination of throughput metrics and entropy metrics) for each generated channel hopping sequence. In block 932, the processor may select one of the generated channel hopping sequences based on the calculated selection metrics for the generated channel hopping sequences.

Figure 10:
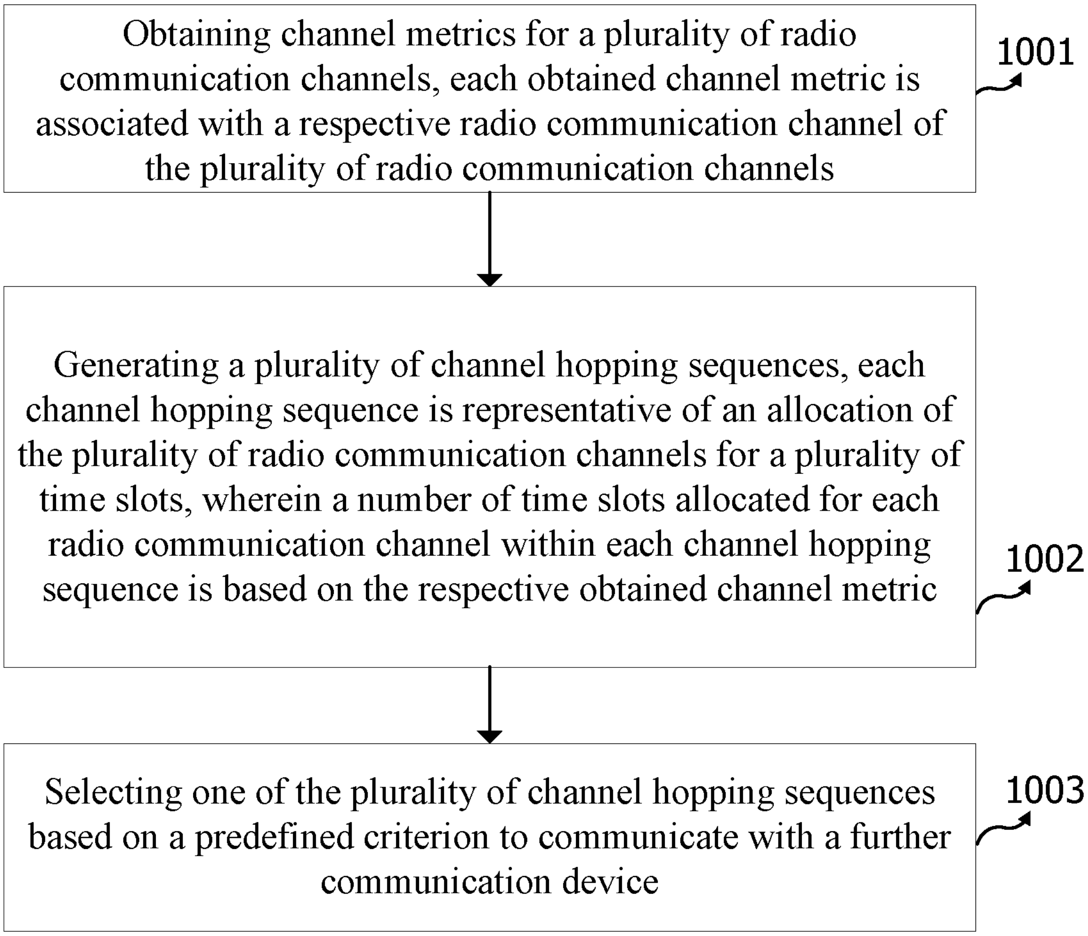
FIG. 10 shows an example of a method.

FIG. 10 shows an example of a method. The method may include obtaining 1001 channel metrics for a plurality of radio communication channels, each obtained channel metric is associated with a respective radio communication channel of the plurality of radio communication channels; generating 1002 a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric; and selecting 1003 one of the plurality of channel hopping sequences based on a predefined criterion to communicate with a further communication device.

In some aspects, methods and apparatus provided in this disclosure may be used to configure various operations that are applicable for BT devices, i.e. communication devices that are configured to communicate according to BT communication protocol. In BT communication, communication links (i.e. connections) are established between BT devices to transfer various types of data. Commonly, the BT communication may be employed to transfer audio data over established links. BT communication may support transfer of audio data over asynchronous connection oriented (ACL) links and synchronous connection oriented (SCO) links.

In duplex communication to transfer audio data between BT devices, BT devices may commonly exchange audio data via an established synchronous link (i.e. an SCO link or an eSCO link), in which the audio is exchanged in both directions for the BT devices. An example implementation may be illustrated with a BT headset including a microphone and a speaker. The BT headset may encode audio data based on audio input received from the microphone to transfer the encoded audio data to another BT device (e.g. a computer), while the BT headset may decode audio data received from the another BT device to provide audio output from the speakers. In this illustrative example, the BT devices may use the SCO link to transport audio data between the BT devices.

In some aspects, one of the BT devices may not desire to provide audio output based on received audio data. The provided audio output may include audio output from speakers, or further processing associated with received audio data, including further encoding of received audio data to convey the information provided within the received audio data to a further communication device or to store the information. In some examples, audio input provided by a BT device may be muted in a manner that the audio data received from the BT device is not important, not needed, or not desired. In such cases, the BT device may not aware of its mute status and continue to send data packets carrying audio data encoded by the BT device.

An SCO link may be a logical transport that is symmetric and point-to-point between BT devices, such a primary device (e.g. the primary device 301) and a secondary device (e.g. the secondary device 302), in particular, for BR/EDR BT. The SCO may reserve slots on physical channel to carry information synchronized with the clock. An eSCO link is referred to as an extended SCO link which, in addition to various operations of the SCO, may provide a support to combine packet types flexibly and may operate with selectable data contents in packets and selectable slot periods. Both SCO and eSCO are suitable to carry constant data rate streams.

In BT synchronous links, BT devices may communicate with each other via allocated slots referencing the synchronization clock. The primary BT device may reserve primary-to-secondary slots in which the primary BT device transmits BT communication signals, and the secondary BT device may initialize on slots. The secondary-to-primary slots in which the secondary BT device may transmit BT communication signals, may directly follow reserved primary-to-secondary slots. The primary BT device sends SCO packets to the secondary BT device in the reserved primary-to-secondary slots, and the secondary BT device may send SCO packets to the primary BT device in the reserved secondary-to-primary slots.

Figure 11:
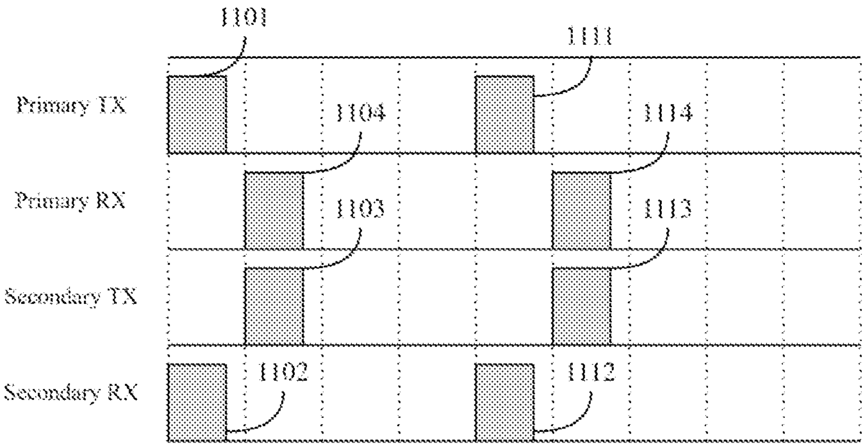
FIG. 11 shows an exemplary illustration of TX/RX timing in BT communication between a primary BT device and a secondary BT device.

FIG. 11 shows an exemplary illustration of TX/RX timing in BT communication between a primary BT device and a secondary BT device. The BT communications may include a polling orchestrated by the primary BT device, such that the secondary BT device may send data packets to the primary BT device in response to receiving data packets from the primary BT device. Considering that the BT communications may include time-division duplex (TDD) communications, the primary BT device may send data packets to the secondary BT device in a first time slot, and the secondary BT device may send data packets to the primary BT device in a second time slot that is allocated for the secondary BT device to respond.

In this illustration, the primary BT device, in an allocated primary-to-secondary slot, transmits a first BT signal 1101, and the secondary BT device may temporally align to the allocated primary to secondary slot, to receive 1102 the transmitted first BT signal. Furthermore, the secondary BT device may transmit a second BT signal 1103 in a following slot that is the secondary-to-primary slot, which the first BT device may receive 1104 in the corresponding slot. Similarly, for a next allocated primary-to-secondary slot, the primary BT device, in an allocated primary-to-secondary slot, transmits a third BT signal 1111, and the secondary BT device receive 1112 the transmitted first BT signal. Furthermore, the secondary BT device may transmit a fourth BT signal 1113 in a following slot that is the secondary-to-primary slot, which the first BT device may receive 1114 in the corresponding slot.

Figure 12:
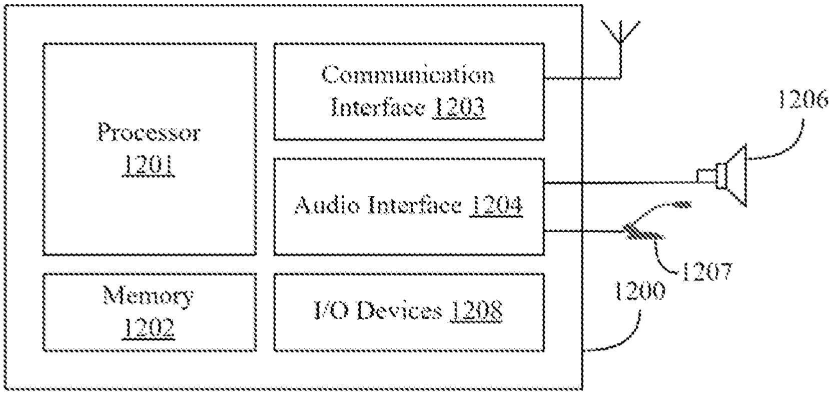
FIG. 12 shows an example of an apparatus for a BT device.

FIG. 12 shows an example of an apparatus for a BT device. The apparatus 1200 may include a processor 1201. The processor 1201 may include a central processing unit, a graphics processing unit, a hardware acceleration unit, a neuromorphic chip, and/or a controller. The processor 1201 may be implemented in one processing unit, e.g. a system on chip (SOC), or an integrated system or chip. The processor 1201 may include more than one processing unit configured to provide various aspects as mentioned herein. In various examples, the communication may include the apparatus 1200, and the processor 1201 may be one or more processors of the communication device (e.g. application processor 212 and optionally protocol processor 210 and digital signal processor 208 as exemplarily provided with respect to FIG. 2). In various examples, the BT device may generally be an electronic device configured to communicate according to a BT communication protocol with a further BT device with an involvement of the apparatus 1200. In some examples, the apparatus 1200 defined here may be the BT device. The BT device may be any type of communication devices that have been provided as examples in this disclosure.

The apparatus 1200 may further include a memory 1202 to store data. The memory 1202 may store an operating system (not shown) including instructions configured to manage various operations of the processor 1201, the memory 1202, and the communication interface 1203, and may further manage operations of audio interface 1204, and input and output (I/O) devices 1206, 1207. The processor 1201 and memory 1202 (and also other various components of the apparatus) and other entities may be communicatively coupled over an internal interface to communicate with each other (e.g. a bus, wires, etc.).

The communication interface 1203 may cause the apparatus 1200 to communicate with further devices (e.g. other communication devices), and accordingly the processor 1201 may manage the communications with other communication devices for the communication device 1200. The communication interface 1203 various components, as exemplarily provided in accordance with FIG. 2, such as antenna system 202, radio frequency (RF) transceiver 204, baseband modem 206 (including digital signal processor 208 and protocol controller 210).

The communication interface 1203 may be configured to transmit and/or receive radio communication signals, via one or more antennas, according to BT communication protocol. The communication interface 1203 may include a separate application processor, and memory, or in various examples, the processor 1201 and the memory 1202 may provide functions of an application processor and memory for communication purposes for the BT communication protocol. The communication interface 1203 may further be configured to perform communications according to another communication protocol. Accordingly, the communication interface 1203 may include multiple transceivers, each transceiver being configured to operate for a particular radio communication protocol.

In some examples, the apparatus 1200 may include an apparatus provided exemplarily with respect to FIG. 5, and accordingly, the processor 1201 may include aspects provided for the processor 501, the memory 1202 may include aspects provided for the memory 502, and the communication interface 1203 may include aspects provided for the communication interface 503.

The apparatus 1200 may include a BT host including the processor 1201, and a BT controller including the communication interface. In this constellation, the processor 1201 may implement various operations including execution of operating system and various applications associated with the purpose of the BT device, and the communication interface 1203 may include a BT transceiver configured to establish one or more physical links with one or more further BT devices. In accordance with various aspects of this disclosure, the apparatus 1200 may perform voice communication operations via the communication interface 1203 with one or more further BT devices. For this purpose, the processor 1201 may execute one or more instructions stored in the memory (e.g. O/S, one or more applications comprising one or more instructions) to cause the BT device to perform voice communication operations. The voice communication operations may include exchange of audio data, receiving and/or making phone calls, receiving and/or sending messages, communicating with a further communication device to exchange audio, holding a voice call, or terminating a voice call.

The apparatus 1200 may further include an audio interface 1204. The audio interface 1204 may be coupled to the processor 1201 and adapted to provide output as an electrical signal representation of an audible signal (i.e. audio signal) or receive electrical signals representing an audible signal. The audio interface 1204 may be, or may include, any type of interface between a designated audio input (e.g. a microphone 1207, an audio input port, etc.) and the processor 1201; or any type of interface between a designated audio output (e.g. a loudspeaker 1206, sound drivers, etc.) and the processor 1201; in order to receive audio signal to process the audio signal at least for the purpose of converting the audio signal into audio data (e.g. encoding), or, to provide an audio signal as output after processing of audio data (e.g. decoding), respectively. In various examples, the audio interface 1204 may simply include wires, conductors, resistors, connectors, etc. and it may further include further active elements, such as amplifiers, filters, etc. In various aspects, the audio interface 1204 may include an audio input interface to receive an audio signal from an audio input device and/or may include an audio output interface to provide an audio signal to an audio output device.

The processor 1201 may be configured to control the communication interface 1203 to stream audio data over an established BT link, causing the communication interface 1203 to receive BT communication signals from the further BT device or to transmit BT communication signals to the further BT device, in which the BT communication signals carry audio data. In a receive operation, the processor 1201 may decode audio data received from the further BT device to obtain an audio signal, which the processor 1201 may provide the obtained audio signal to the audio interface 1204. In a transmit operation, the processor 1201 may encode audio signal received from the audio interface 1204 into audio data to transmit the audio data to the further BT device via the communication interface 1203. The exchange of audio data between the BT device and the further BT device may be via data packets carrying the audio data.

The audio data may include data that is encoded according to various audio coding methods, and the processor 1201 may be configured to perform audio coding/decoding methods to encode or decode audio data, such as continuously variable slope delta modulation (CVSD), low-complexity subband codec (SBC), MPEG-1, MPEG-2, MPEG-4, advance audio coding (AAC), etc. In particular, an established SCO link may carry audio data encoded with CVSD. The processor 1201 may be configured to execute various instructions associated with various designated BT communication profiles, such as the headset profile, the hands-free profile, and the synchronous connection between BT devices may be referred to as audio connection.

In some aspects, the processor 1201 may be configured to encode data for transmissions via an established synchronous link selectively. The selective operation may include, encoding audio data packets based on received audio input or by encoding NULL data packets. In other words, the processor 1201 may operate in a first operation mode in which the processor 1201 may encode audio data packets based on received audio input from the audio interface 1204, and in a second operation mode in which the processor 1201 may encode NULL data packets irrespective of, or independent of, receiving audio input from, or presence of an audio input provided by, the audio interface 1204.

The processor 1201 may determine whether a transmission is to include an encoded audio packet or whether the transmission is to include an encoded NULL data packet based on decoded information within a packet header of a decoded data packet received via the established synchronous link from the further BT device (peer BT device) that is the further BT device that is connected via the established synchronous link to the BT device. In other words, the processor 1201 may determine to operate in a first operation mode or in a second operation mode for the respective synchronous link based on decoded information within a packet header of a decoded data packet received via the established synchronous link. Based on the determination, the processor 1201 may either encode audio data packet for a transmission to the further BT device over the established synchronous link, or encode NULL data packet for a transmission to the further BT device over the established synchronous link.

In various aspects, the above-mentioned determination of whether a transmission is to include an encoded audio packet or whether the transmission is to include an encoded NULL packet may be referred to as a determination of a determination result. The determination result may represent either a transmission is to include an encoded audio packet (i.e. first operation mode) or the transmission is to include a NULL packet. The determination result representing that the transmission is to include a NULL packet may be referred to as the BT device is muted.

A NULL data packet is a data packet including a packet header and the respective channel access code for the link but no payload. The NULL data packet may have a predefined size that is fixed (e.g. 126 bits). In BT communication, BT devices may use a NULL packet to indicate to a peer BT device that a transmitted data packet by the peer BT device has been successfully received or in some examples status of the RX buffer (FLOW). The peer BT device receiving a NULL packet, in general, may not need to acknowledge receiving the NULL packet.

In some aspects, the decoded information used to determine the operation may include, or may be, a flow bit included in the packet header of a received data packet from the further BT device. The processor 1201 may determine that the transmission is to include the encoded audio data packet if the decoded flow bit is 1, and that the transmission is to include the encoded NULL packet if the decoded flow bit is 0. In some aspects, the corresponding decoded data packet is the latest received data packet. In particular, when the BT device is the secondary device and the further BT device is the primary device for the established synchronous link, referring back to FIG. 11, the processor 1201 may decode a data packet from received first BT signal 1102, and the processor 1201 may determine whether to send a NULL data packet or an encoded audio data packet in the corresponding secondary-to-primary slot as the second BT signal 1103 based on the decoded information obtained from the decoded data packet from received first BT signal 1102. In various aspects, the decoded information may be considered to indicate a mute status for the BT device including the apparatus 1200. And accordingly, the determination performed by the processor 1201 may represent the implementation of the mute status for the BT device including the apparatus 1200.

Accordingly, the further BT device may encode data packets for the respective synchronous link to indicate the BT device whether the BT device is muted (i.e. no audio data is expected from the BT device) or not, and the apparatus 1200 may cause the BT device to transmit BT signals including encoded audio packets when the BT device is not muted, or transmit BT signals including encoded NULL packets when the BT device is muted.

In some aspects, the processor 1101 may store information into the memory 1102 representing whether the transmission is to include a data packet including encoded audio data or to include NULL packet based on a first decoded information obtained from a decoded data packet received from the further BT device, and the processor may determine whether further transmissions are to include a data packet including encoded audio data or to include NULL packet for further packets based on the stored information. The processor 1101 may adjust the stored information based on a further decoded information obtained from a further decoded data packet received from the further BT device indicating a change at the mute status.

Figure 13:
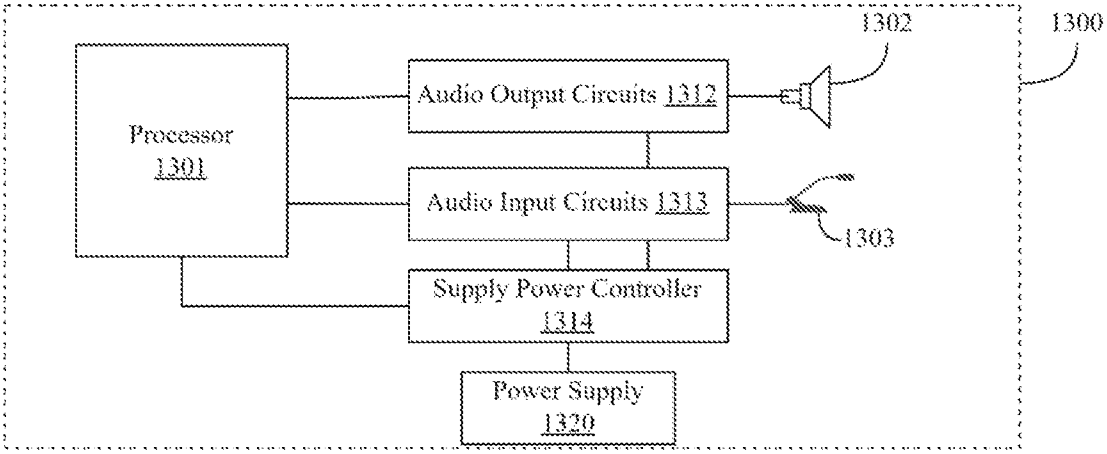
FIG. 13 shows an exemplary schematic illustration of an apparatus.

FIG. 13 shows an exemplary schematic illustration of an apparatus. The apparatus 1300 may be the apparatus provided in accordance with respect to FIG. 12. Accordingly, the apparatus may include a processor 1301 (e.g. the processor 1302), an audio output device 1302, and an audio input device 1303. The processor 1301 may be coupled to audio output circuits 1312 to provide audio output from the audio output device 1302. The processor 1302 may be coupled to audio input circuits 1313 to receive audio input signals from the audio input device 1313. In some aspects, the audio output circuits 1312 and the audio input circuits 1313 may correspond to audio interface provided with respect to FIG. 12.

The apparatus 1300 may further include a power supply 1320 to provide supply power for operation of the audio input circuits 1313 and the audio input device 1303. The power supply 1320 may further provide supply power for the processor 1303, the audio output circuits 1312, the audio output device 1302, and/or other circuits of the apparatus 1300. Furthermore, the apparatus 1300 may further include a power supply controller 1314 configured to control the supply power provided at least to the audio input circuits 1313 and/or the audio input device.

Analogous to the apparatus 1200, the processor 1301 may encode audio signal received from the audio input device 1303 via the audio input circuits 1313 into audio data for transmission of the audio data to the further BT device. The audio input circuits may include various components such as one or more audio filters (e.g. an audio bank), one or more amplifiers, one or more digital signal processors, one or more impedance matching circuits, etc.

The processor 1301 may, in accordance with operations mentioned with respect to FIG. 12, obtain decoded information within a packet header of a decoded data packet received via the established synchronous link, and determine a determination result representing whether to perform a transmission of BT signals including an encoded audio data packet or an encoded NULL data packet based on the obtained decoded information. In various examples, the obtained decoded information may indicate whether the BT device including the apparatus 1300 is muted by the peer BT device that is the other end of the established synchronous link.

In various examples, the apparatus 1300 may power down various components that may be used to provide audio input to the processor 1301. Considering that the further BT device does not expect any audio data from the BT device including the apparatus 1300, it may be preferable to conserve power by switching designated components which may be used to transform sound received from a user using the audio input device 1303 to audio input received from the processor 1301.

In some aspects, based on the determination result, the processor 1301 may provide a signal representative of the determination result (i.e. representative of the decoded information) to the audio input circuits 1313. The audio input circuits 1313 may be configured to operate in a low power mode other than a normal mode, and the provided signal representing the determination result as that the transmission is to be performed with a NULL packet may cause the audio input circuits 1313 to operate in the low power mode. Furthermore, the provided signal representing the determination result is that the transmission is to be performed with an encoded audio data packet may cause the audio input circuits 1313 to operate in the normal mode.

The low power mode may be any mode which consumes lower power than the normal mode. During the low power mode, one or more components of the audio input circuits 1313 may consume low power or no power. In the low power mode, the processor 1301, or a controller of the audio input circuits 1313 according to a control signal provided by the processor 1303, may cause one or more components of the audio input circuits 1313 to be deactivated or disabled. For example, in the normal mode, the one or more amplifiers of the audio input circuits 1313 may amplify audio signals with a designated gain, while in the low-power mode, the one or more amplifiers of the audio input circuits 1313 may not operate, or amplify with much less gain. In various examples, the processor 1301 may deactivate the audio input circuits 1313.

In some aspects, the processor 1301 may control the audio input device based on the determination result (i.e. representative of the decoded information). The audio input device 1303 may be configured to operate in a low power mode other than a normal mode, and the processor 1303 may, based on the determination result representing that the transmission is to be performed with a NULL packet, cause the audio input device 1303 to operate in the low power mode. Furthermore, based on the determination that the transmission is to be performed with an encoded audio data packet, the processor may cause the audio input device 1303 to operate in the normal mode. The processor 1301 may control the audio input device 1303 with a control signal designated for this purpose.

In some aspects, the processor 1301 may control the supply power controller 1314 based on the determination result to cause the supply power controller 1314 to provide the supply power to the audio input circuits 1313 and/or the audio input device 1303. The processor 1301 may cause the supply power controller 1314 to provide power supply to the audio input circuits 1313 and/or the audio input device 1303 in case the determination result represents that the transmission is to be performed with an encoded audio data packet. The processor 1301 may cause the supply power controller 1314 to not to provide power supply to the audio input circuits 1313 and/or the audio input device 1303 in case the determination result represents that the transmission is to be performed with a NULL packet.

In any one of the examples, the processor 1301 may maintain the control provided for power conservation. In other words, once the processor 1301 controls one of the circuits/blocks by switching into a low power mode, the circuits/blocks operate in the low power mode until the processor 1301 recontrols the respective circuit/block, in response to a change at the determination result, to operate in a normal mode.

Referring back to FIG. 12, in some aspects, the apparatus 1200 may further include one or more input and output (I/O) devices 1208 that are communicatively coupled to the internal interface. It is depicted in the illustrative example that the apparatus 1200 includes I/O devices 1208, however, this should not be taken as limiting, and the I/O devices 1208 may be communicatively coupled to the apparatus 1200 via the communication interface 1203. The BT device may include the I/O devices 1208.

The I/O devices 1208 may include various components and devices to provide input to the apparatus 1200, in particular for the processor 1201 to process received input to associate it for various instructions. The I/O devices 1208 may include input devices that are designated based on the use case of the BT device including the apparatus 1200. In some examples, the I/O devices 1208 may include a designated button, such as a mute button. The provided input may include, in particular, an input associated with an interaction of a user using the respective input device. Exemplarily, a mouse may be one of the I/O devices 1208 configured to deliver user interactions by moving a pointer via hand movements or pressing keys or a keyboard may be one of the I/O devices 1208 delivering user interactions by receiving keystrokes, or a touchpad may be one of the I/O devices 1208 delivering user interactions by receiving touch inputs, etc.

The I/O devices 1208 may be configured to provide an output based on instructions executed by the processor 1201. The I/O devices 1208 may include output devices that are designated depending on the use case of the communication device 1200. The provided output may include, in particular, an output to present various types of information or indications for a user. For example, a display may be one of the I/O devices 1208 configured to display visual information to the user in form of images, text, pictures, videos, etc.

It should be noted that an I/O device may be both an input device and an output device for the BT device including the apparatus 1200 within this context. For example, one of the input/output devices 1208 may include a display configured to provide a visual output to a user. Furthermore, the display may include a touch screen display that is configured to receive input from the user interacting with the display. The contact interaction from the user may be detected by a touch input unit. The touch input unit may be configured to detect the interaction of the user with the display via a contact of the user. The touch input unit may be configured to detect contact and/or movement of the user (e.g. via a finger, via a stylus, etc.) while touching the display. Alternatively, the touch input unit may be configured to detect the interaction of the user via another defined surface. For example, the touch input may include a touchpad that is configured to receive input from the user. Accordingly, such a display may be both an example of an input device and an output device.

In various examples, the user may interact one of the input devices of the I/O devices 1208 to override the determination result. The mute status may represent one of the two operation modes associated with the selective operation of the processor 1201, namely the first operation mode in which the processor 1201 may encode audio data packets based on received audio input from the audio interface 1204, and the second operation mode in which the processor 1201 may encode NULL data packets irrespective of, or independent of, receiving audio input from, or presence of an audio input provided by, the audio interface 1204. The input received from the respective input device may further change the operation mode from the first operation mode to the second operation mode and/or from the second operation mode to the first operation mode. Accordingly, in addition to the configurating operation provided by the further BT device, the apparatus 1200 may choose the operation mode based on received user interaction.

Aspects provided herein may imply that the BT device including the apparatus 1200 may be a secondary device (i.e. peripheral device) but this may not be limiting. Although some aspects provided herein may indicate that decoded data packet including the decoded information is received in a primary-to-secondary slot, which is used to determine the determination result starting from the following secondary-to-primary slot, the processor 1201 may receive the decoded data packet including the decoded information in a secondary-to-primary slot, which is used to determine the determination result starting from the following primary-to-secondary slot (i.e. the BT device including the apparatus is a primary device).

In some aspects, in particular for aspects in which the BT device may be the device that indicate a mute status for the further BT device, the processor 1201 may determine whether an audio input is expected or not from the further BT device. In some examples a user of the BT device may provide an interaction, via the I/O devices 1208, to mute the audio input received from the further BT device. Accordingly, the BT device may convey to the further BT device that provision of the audio data by the further BT device is not expected. The conveyed information corresponds to the decoded information, which some of its aspects are provided above. The determination of whether an audio input is expected or not from the further BT device may result in a determination result, which will be referred to as a further determination result to discriminate from above-mentioned aspects, which the further determination result represents either an audio input is expected from the further BT device or an audio input is not expected from the further BT device.

The processor 1201 may encode audio signal received from the audio interface 1204 into audio data to transmit the audio data to the further BT device via the communication interface 1203. The exchange of audio data between the BT device and the further BT device may be via data packets carrying the audio data. The processor 1201 may encode data packets including the encoded audio data for transmissions to the further BT device over the established synchronous link. The encoded data packet may include a packet header including information representing of the further determination result. The processor 1201 may set the respective information for packet header transmitted to the further BT device based on the further determination result, which may be stored in the memory 1202. The respective information may be the flow bit of the packet header. The processor may set the flow bit to 1 if the determination result is representative of an expectation of the audio input, and to set the flow bit to 0 if the determination result is representative of no expectation of the audio input.

Figure 14:
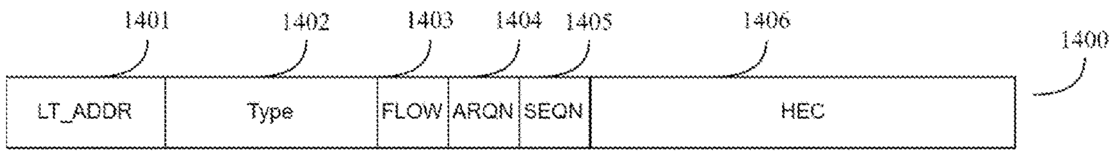
FIG. 14 shows an example of a packet header in BT communication.

FIG. 14 shows an example of a packet header in BT communication. The packet header 1400 illustrates a packet header for BR/EDR mode. The packet header 1400 includes an LT_ADDR field 1401 of 3 bits representing the destination for the packet, a type field 1402 of 4 bits representing the type of packet used to determine number of slots occupied for the data packet, a flow control bit 1403 mainly allocated for control of ACL links, an automatic repeat request number (ARQN) bit 1404 to inform the source for a successful transfer of payload, a sequence number (SEQN) bit 1405 representing a sequential numbering scheme to order of the data packet stream, and a header error check field 1406 of 8 bits used to check the integrity of the packet header.

In various aspects provided herein, the flow control bit 1403 may carry the information representing whether audio input is expected from a BT device or not (i.e. corresponding to the "decoded information"). The flow bit 1403 is mainly provided to control ACL links, and although there is an allocation of a flow bit in packet headers associated with synchronous links as well, it is practically unused in many use cases. In various aspects provided herein, the flow bit 1403 may be used to represent whether an audio input is expected from a BT device (i.e. whether the BT device is muted for audio input).

Figure 15:
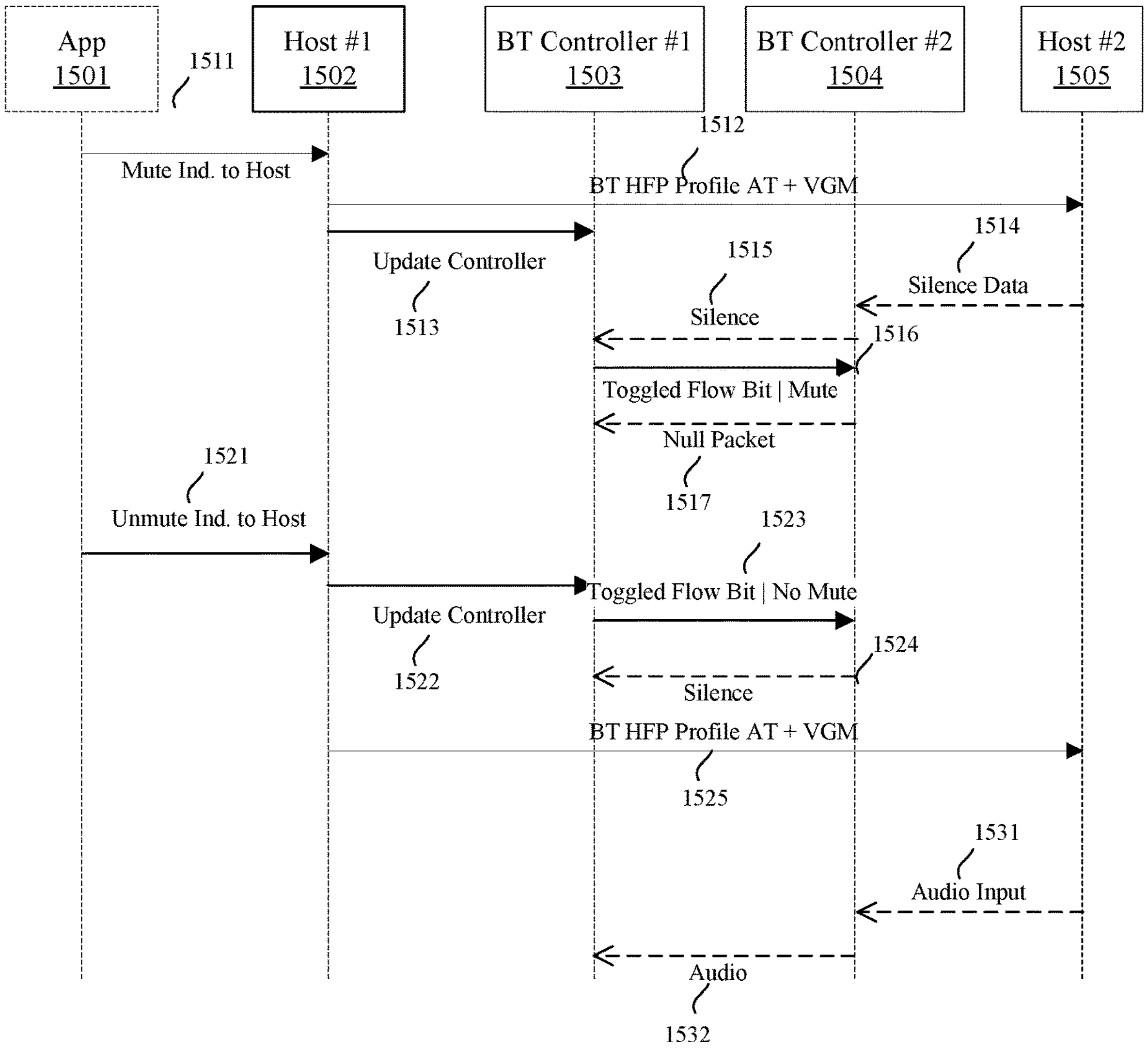
FIG. 15 shows an exemplary illustration of exchange of messages between two BT devices.

FIG. 15 shows an exemplary illustration of exchange of messages between two BT devices. In this example, a first BT device may include an application 1501 executed by a processor of a first apparatus, a first BT host 1502 which the processor may implement, and a first BT controller 1503. The second BT device may include a second apparatus including a second BT controller 1504 and a second BT host 1505 which the processor may of the apparatus may implement. Each of the first apparatus and the second apparatus may include an apparatus exemplified in accordance with FIG. 12. Aspects provided here for a host may correspond to operations of the processor 1201, and aspects provided here for a controller may correspond to operations of the communication interface 1203.

The application 1501 may provide, as a response to a user interaction, a mute indication 1511 to the first BT host 1502. Based on the received mute indication 1511, the first BT host 1502 may encode an attention message 1512 according to the hands-free profile of BT, which the attention message may represent to set the gain associated with the audio input device of the second BT device to 0. The first BT host 1502 may further update 1513 the configuration of the first BT controller 1503 (i.e. set the further determination result to represent that audio input is not expected from the second BT device).

Meanwhile, the second BT host 1505 sets the gain associated with the audio input device of the second BT device to 0 based on received attention message 1512, and the second BT host 1505 continues encoding audio data packets including encoded audio data 1514 based on an audio input 0 (i.e. silence data), and the second BT controller 1504 may send encoded audio packets 1515 as silence to the first BT device.

Once the update 1513 provided to the first BT controller 1503 representing the further determination result is effective, and the first BT controller 1503 starts encoding audio packets with a packet header representing that the audio input from the second BT device is not expected (e.g. flow bit). The first BT controller 1503 may send the encoded audio packet including the flow bit set to mute 1516 to the second BT controller 1504 (to the second BT device), which the second BT controller 1504 may respond with the an encoded null packet 1517 based on a detection of flow bit set to mute. From now on, the communication between the first BT controller 1503 and the second BT controller 1504 may continue in the same way, namely by first BT controller 1503 sending encoded audio data packets with a flow bit set to mute, and the second BT controller 1504 sending, as response to received data packet with a flow bit set to mute, a NULL packet until a change in the operation, which the step 1521 initiates.

The application 1501 may provide, as a response to a user interaction, an unmute indication 1521 to the first BT host 1502. Based on the received unmute indication 1521, the first BT host 1502 may update 1522 the configuration of the first BT controller 1503 (i.e. set the further determination result to represent that audio input is expected from the second BT device). Once the update 1522 provided to the first BT controller 1503 representing the changed further determination result is effective, the first BT controller 1503 starts encoding audio packets with a packet header representing that the audio input from the second BT device is expected (e.g. flow bit). The first BT controller 1503 may send the encoded audio packet including the flow bit set to unmute 1523 to the second BT controller 1504 (to the second BT device), which the second BT controller 1504 may respond with the an encoded audio packet including encoded audio data that is silent 1524 based on a detection of flow bit set to unmute.

Furthermore, the first BT host 1502 may encode an attention message 1525 according to the hands-free profile of BT, which the attention message may represent to set the gain associated with the audio input device of the second BT device to a designated gain. The second BT host 1505 sets the gain associated with the audio input device of the second BT device to the designated gain based on received attention message 1525, and accordingly the second BT host 1505 may start encoding audio data packets including encoded audio data 1531 based on an audio input with a designated gain that is not 0, and the second BT controller 1504 may send encoded audio packets 1532 including actual audio to the first BT device.

Figure 16:
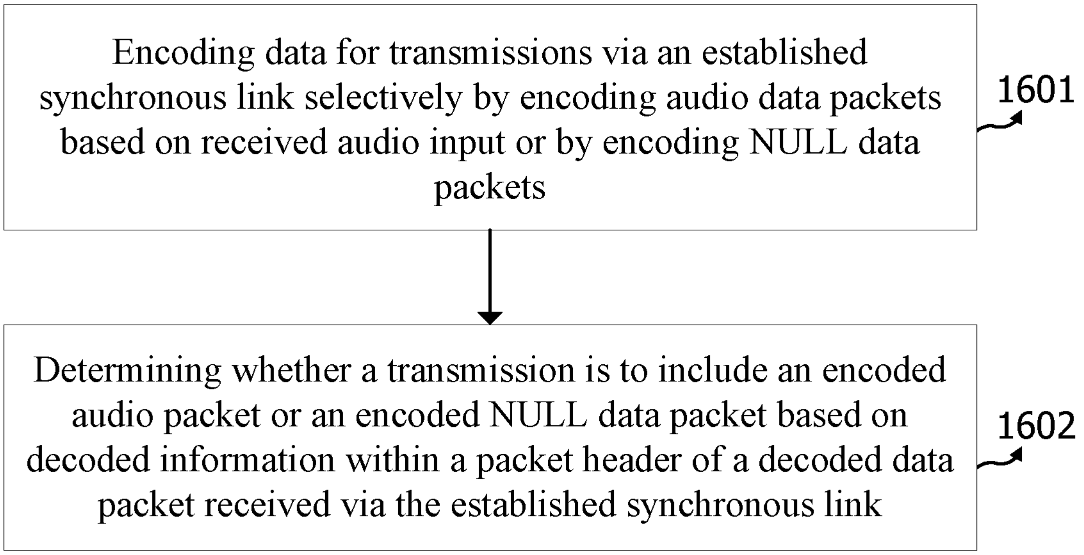
FIG. 16 shows an example of a method.

FIG. 16 shows an example of a method. The method may include encoding 1601 data for transmissions via an established synchronous link selectively by encoding audio data packets based on received audio input or by encoding NULL data packets and determining 1602 whether a transmission is to include an encoded audio packet or an encoded NULL data packet based on decoded information within a packet header of a decoded data packet received via the established synchronous link.

Figure 17:
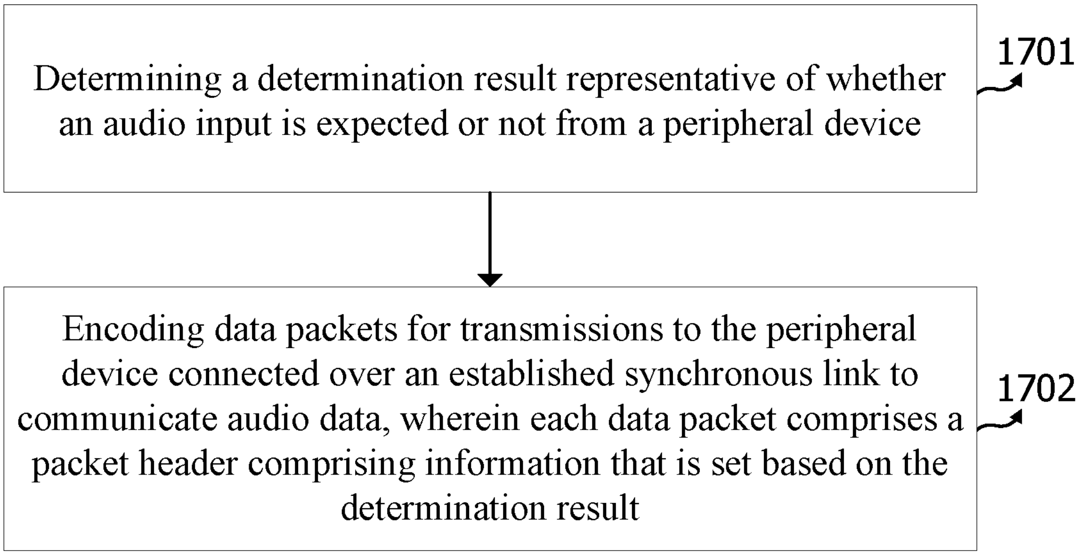
FIG. 17 shows an example of a method.

FIG. 17 shows an example of a method. The method may include determining 1701 a determination result representative of whether an audio input is expected or not from a peripheral device, and encoding 1702 data packets for transmissions to the peripheral device connected over an established synchronous link to communicate audio data, wherein each data packet comprises a packet header comprising information that is set based on the determination result.

In some aspects, methods and apparatus may be configured to provide for a computing device various accessibility mechanisms with an intention to improve accessibility for visually impaired users. The computing device may operate in various modes, such as in a sleep mode, in a hibernate mode, and an accessibility mode may be defined for the computing device to provide various accessibility mechanism. In particular, an additional interface may be established to control various operations associated with executed applications and existing user interface according to received user interactions with an input device. In some aspects, the accessibility mode may further include designated management of input and output devices with an intention to conserve power.

In various examples, the input device that is configured to receive user interactions may be a keyboard specifically configured for visual impaired users, such as a tactile keyboard, a braille supported keyboard, and such. The input device may be configured to transmit short-range wireless communication signals carrying control information representative of a received user interaction by the input device. The input device may accordingly include physical input elements to receive user interactions, a processor and a communication interface (e.g. a short-range wireless communication transceiver) to encode control information based on received user interactions and transmit short-range wireless communication signals including encoded control information over an established link with the computing device.

Figure 18:
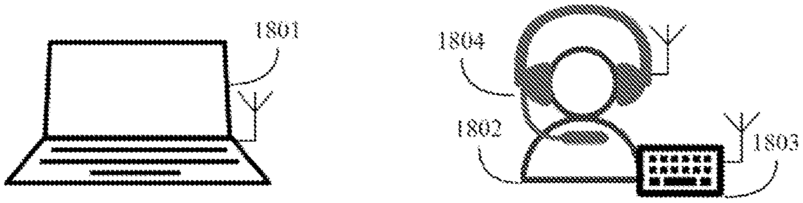
FIG. 18 shows an exemplary illustration of a topology including a computing device.

FIG. 18 shows an exemplary illustration of a topology including a computing device. In this topology, it is illustrated that a user 1802 may control a computing device 1801 via an input device 1803. The computing device 1801 may be any type of computing device which a user may control via user interface (such as a desktop computer, a laptop computer, a workstation, a tablet computer, a smartphone, a mobile computer, a notebook computer, a server, a handheld computing device, a wearable device, an internet of things (IoT) device, a mobile phone, a cellular telephone, an in-vehicle computer, etc. The input device 1803 may be the input device in the above-mentioned paragraph preferably with various accessibility functions, such as a tactile keyboard or a braille keyboard.

The input device 1803 and the computing device 1801 are configured to communicate at least with each other by using short-range radio communication over one or more established links. The input device 1803 may send control information representative of the interaction of the user with the input device 1803 (e.g. pressing keys, touch inputs, etc.) over the one or more established links to the computing device 1801. Based on the received control information, the computing device 1801 may perform various operations, such as execute instructions, through which the computing device 1801 may control various aspects of software programs executed by the processor of the computing device 1801, its user interface, further devices that are coupled with the computing device 1801, etc.

Furthermore, the computing device 1801 may provide various types of outputs associated with its operation, including visual output, tactile output, audial output, sensory output, data output, etc. In this illustrative example, the user 1802 is further associated with (i.e. wears) an external output device depicted as a headset 1804, which is connected wirelessly, via the same or another short-range wireless communication technology, to the computing device 1801. Accordingly, the user 1802 may access output of the computing device 1801 via various type of outputs provided by the computing device and/or an external output device 1804 that is communicatively coupled to the computing device 1801.

In various examples, the input device 1803 and the computing device 1801 may operate according to a designated and common interfacing protocol such as the human interface device protocol. According to the HID protocol, the computing device 1801 may be configured to operate as a host entity and the input device 1803 may be configured to operate as a device entity in the HID. The input device 1803 may, accordingly, interact with the user 1802. The computing device 1801 may communicate with the input device 1803 and may receive data (e.g. HID reports) including the control information from the input device 1803 representing actions performed by the user 1802.

The input device 1803 may store a predefined HID descriptor (i.e. report descriptor) in a memory and send the HID descriptor to the computing device 1801, which may describe the data packets of the input device 1803 for the computing device 1801. The HID descriptor may further include information representing packet types, the size of data packets, and purpose information representing the purpose of each information element within the data packet. As a very simple, the purpose information may inform the computing device 1801 that a particular bit in a particular packet number is used to indicate whether the key "A" is pressed or not. The computing device 1801 may receive the HID descriptor from the input device 1803 and analyze the received HID descriptor into logical syntactic components (i.e. parse) to match it to its operations of the operating system of the computing device 1801. Once the computing device 1801 has parsed the HID descriptor, the computing device 1801 may translate HID reports received from the input device 1803 into usable information representing instructions of the user 1802. In various aspects, the input device 1803 and the computing device 1801 may be configured to operate according to Bluetooth HID, Serial HID, ZigBee HID, USB HID, etc.

In various examples, the input device 1803 and the computing device 1801 may operate according to a designated and common interfacing protocol, which may not be the HID protocol. For this purpose and within this context, the computing device 1801 may store and execute a designated software program (e.g. device driver) to establish an interface that may be specific to various attributes of the input device 1803, and through the designated software program, the computing device 1801 may translate control information received from the input device 1803 into information usable by its operating system.

In general, although the computing device 1801 may be configured to perform and execute an instruction based on received control information from the input device 1803, the extent of operations performed by the computing device 1801 may be limited. For example, a received control information may simply provide an indication of a particular keystroke, or a simple predefined function for the computing device 1803. It may be desirable to cause the computing device 1801 to perform complex operations through a set of instructions, which the set may also be programmable. The set of instructions may include a plurality of instructions to be executed in a predefined order, and accordingly, a software program executed by the computing device 1801 may perform a complex action, such as to execute a mailing application, read out unread emails in a predefined order while requesting a response for each read out email based on received single control information. It may be desirable to implement such an approach to increase accessibility of the computing device.

Figure 19:
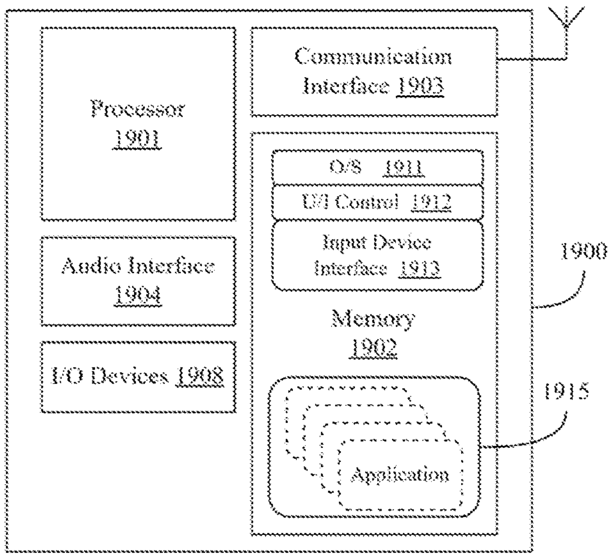
FIG. 19 shows an example of an computing device.

FIG. 19 shows an example of an computing device. The computing device 1900 may include a processor 1901. The processor 1901 may include a central processing unit, a graphics processing unit, a hardware acceleration unit, a neuromorphic chip. The processor 1901 may be implemented in one processing unit, e.g. a system on chip (SOC), or an integrated system or chip. The processor 1901 may include more than one processing unit configured to provide various aspects as mentioned herein. In various examples, the processor 1901 may be one or more processors of the communication device (e.g. application processor 212 and optionally protocol processor 210 and digital signal processor 208 as exemplarily provided with respect to FIG. 2).

The computing device 1900 may further include a memory 1902 to store data. The processor 1901 and memory 1902 (and also other various components of the computing device) and other entities may be communicatively coupled over an internal interface to communicate with each other (e.g. a bus, wires, etc.). The memory 1902 may store an operating system (O/S) 1911 including instructions which, if executed by the processor 1901, cause the processor to manage various operations of the processor 1901, the memory 1902, and the communication interface 1903, and may further manage operations of audio interface 1904, and input and output (I/O) devices 1908, or any other hardware component communicatively coupled to the computing device 1900, including a user input device (e.g. the input device 1803). The user input device may be an input device suitable for a visually impaired user. In various examples, the user input device may include a keyboard, in particular a tactile user input device or a braille keyboard.

The memory 1902 may further store user interface (U/I) control 1912 instructions configured to control various operations of a user interface of the computing device 1900. In various examples, the user interface may be a graphical user interface displayed on a display, through which the user may interact with the computing device 1900 to control various operations and services provided by the computing device 1900. The memory 1902 may further store applications (i.e. software programs) 1915 including instructions configured to cause the computing device to perform a particular operation or to provide a particular service based on the purpose of the application. Few examples may include a mailing application configured to receive and send e-mails, a navigation application configured to provide a navigation service, a voice communication application configured to provide a voice communication service to the user, etc. Each application 1915 may include an application programming interface through which the respective application may be controlled based on predefined parameters. The O/S 1911 may, with its execution by the processor 1901, cause the processor to manage various operations of the U/I control 1912, the application 1915, and also an input device interface 1913.

The communication interface 1903 may cause the computing device 1900 to communicate with further devices (e.g. other communication devices), and accordingly the processor 1901 may manage the communications with other communication devices for the communication device 1900. The communication interface 1903 various components, as exemplarily provided in accordance with FIG. 2, such as antenna system 202, radio frequency (RF) transceiver 204, baseband modem 206 (including digital signal processor 208 and protocol controller 210).

The communication interface 1903 may be configured to transmit and/or receive radio communication signals, via one or more antennas, according to a short-range wireless communication protocol, such as the BT communication protocol. The communication interface 1903 may include a separate application processor, and memory, or in various examples, the processor 1901 and the memory 1902 may provide functions of an application processor and memory for communication purposes for the BT communication protocol. The communication interface 1903 may further be configured to perform communications according to another communication protocol. Accordingly, the communication interface 1903 may include multiple transceivers, each transceiver being configured to operate for a particular radio communication protocol.

In some examples, the computing device 1900 may include an computing device provided exemplarily with respect to FIG. 12, and accordingly, the processor 1901 may include aspects provided for the processor 1201, the memory 1902 may include aspects provided for the memory 1202, and the communication interface 1903 may include aspects provided for the communication interface 1203.

The computing device 1900 may include a short-range wireless communication host, such as BT host, including the processor 1901, and a short-range wireless communication controller, such as a BT controller. In this constellation, the processor 1901 may implement various operations including execution of O/S 1911 and various applications 1915, and the communication interface 1903 may include a BT transceiver configured to establish one or more links with a user input device. The processor 1901 may execute one or more instructions stored in the memory (e.g. O/S, one or more applications comprising one or more instructions) to cause the computing device to communicate with the user input device to receive control information. In some examples, the communication interface 1903 may listen the established one or more links to receive control information. Accordingly, the communication interface 1903 may receive short-range wireless communication signals, such as BT signals, via the established one or more links from the user input device, and the processor 1901 may decode received short-range wireless communication signals to obtain the control information.

The computing device 1900 may further include an audio interface 1904. The audio interface 1904 may be coupled to the processor 1901 and adapted to provide output as an electrical signal representation of an audible signal (i.e. audio signal) or receive electrical signals representing an audible signal. The audio interface 1904 may be, or may include, any type of interface between a designated audio input (e.g. a microphone, an audio input port, etc.) and the processor 1901; or any type of interface between a designated audio output (e.g. a loudspeaker, sound drivers, etc.) and the processor 1901; in order to receive audio signal to process the audio signal at least for the purpose of converting the audio signal into audio data (e.g. encoding), or, to provide an audio signal as output after processing of audio data (e.g. decoding), respectively. In various examples, the audio interface 1904 may simply include wires, conductors, resistors, connectors, etc. and it may further include further active elements, such as amplifiers, filters, etc. In various aspects, the audio interface 1904 may include an audio input interface to receive an audio signal from an audio input device and/or may include an audio output interface to provide an audio signal to an audio output device. The audio input device or the audio output device may be one of the I/O devices 1908 or they may be external devices which the computing device 1901 may communicate via the communication interface 1903.

The processor 1901 may be configured to control the communication interface 1903 to stream audio data over a further established short-range wireless link, such as a further BT link, causing the communication interface 1903 to receive short-range wireless communication signals from an external audio device or to transmit BT communication signals to the external audio device, in which the short-range wireless communication signals may carry audio data. In a receive operation, the processor 1901 may decode audio data received from the external audio device to obtain an audio signal, which the processor 1901 may provide the obtained audio signal to the audio interface 1904. In a transmit operation, the processor 1901 may encode audio signal received from the audio interface 1904 into audio data to transmit the audio data to the external audio device via the communication interface 1903. The exchange of audio data between the BT device and the external audio device may be via data packets carrying the audio data. In some examples, in which the audio data is streamed to/from one of the I/O devices 1908, the communication may be performed via the internal bus or a further connection with the respective I/O device 1908.

The computing device 1900 may further include one or more input and output (I/O) devices 1908 that are communicatively coupled to the internal interface. It is depicted in the illustrative example that the computing device 1900 includes I/O devices 1908, however, this should not be taken as limiting, and the I/O devices 1908 may be communicatively coupled to the computing device 1900 via the communication interface 1903. The BT device may include the I/O devices 1908.

The I/O devices 1908 may include various components and devices to provide input to the computing device 1900, in particular for the processor 1901 to process received input to associate it for various instructions. The I/O devices 1908 may include input devices that are designated based on the use case of the BT device including the computing device 1900. In some examples, the I/O devices 1908 may include a designated button, such as a mute button. The provided input may include, in particular, an input associated with an interaction of a user using the respective input device. Exemplarily, a mouse may be one of the I/O devices 1908 configured to deliver user interactions by moving a pointer via hand movements or pressing keys or a keyboard may be one of the I/O devices 1908 delivering user interactions by receiving keystrokes, or a touchpad may be one of the I/O devices 1908 delivering user interactions by receiving touch inputs, etc.

The I/O devices 1908 may be configured to provide an output based on instructions executed by the processor 1901. The I/O devices 1908 may include output devices that are designated depending on the use case of the communication device 1900. The provided output may include, in particular, an output to present various types of information or indications for a user. For example, a display may be one of the I/O devices 1908 configured to display visual information to the user in form of images, text, pictures, videos, etc.

It should be noted that an I/O device may be both an input device and an output device for the BT device including the computing device 1900 within this context. For example, one of the input/output devices 1908 may include a display configured to provide a visual output to a user. Furthermore, the display may include a touch screen display that is configured to receive input from the user interacting with the display. The contact interaction from the user may be detected by a touch input unit. The touch input unit may be configured to detect the interaction of the user with the display via a contact of the user. The touch input unit may be configured to detect contact and/or movement of the user (e.g. via a finger, via a stylus, etc.) while touching the display. Alternatively, the touch input unit may be configured to detect the interaction of the user via another defined surface. For example, the touch input may include a touchpad that is configured to receive input from the user. Accordingly, such a display may be both an example of an input device and an output device.

The input device interface 1913 stored in the memory may include one or more instructions which, through the execution of the processor 1901, may cause the processor 1901 to translate the control information that is received from the user input device into a set of instructions to control one or more software programs executed by the processor 1901. The one or more software programs may include at least one of the O/S 1911, the U/I control 1912, or the application 1915.

The user input device may selectively send control information based on received user interaction from a set of control information elements, and each control information element may correspond to a particular received user interaction. The input device interface 1913 may accordingly include information representing a set of instructions for each control information element. The processor 1901 may establish an interface according to the input device interface 1913, and with the establishment of an interface configured to control one or more software programs executed by the processor 1901, the established interface may control a software program from the one or more software programs by providing the set of instructions corresponding to received control information. The established interface may be referred to as a user input device interface within this disclosure. In various aspects, the input device interface 1913 may include a device driver associated with the user input device to control the one or more software programs, or a designated interface established between HID interface and the one or more software programs.

Furthermore, the input device interface 1913 may be programmable, such that the processor 1901 may adjust at least one set of instructions corresponding to at least one control information element respectively. For example, a user may use the I/O devices to enter or change a particular action or a set of actions, and the processor 1901 may store the set of instructions associated with the particular action or the set of actions.

Each software program may receive the set of instructions provided according to the respective control information, and perform various operations according to received set of instructions. Each software program may include an API configured to receive the set of instructions, which may include various parameters designated for specific functions, and the respective software program may accordingly perform a predefined action corresponding to the set of instructions. In some aspects, a software program may further provide an output to the established interface. The established interface may, based on the provided output, trigger the processor 1901 to encode audio data representing the output. In some aspects, a provided output may simply indicate an affirmative (i.e. action has been performed successfully) or a negative (i.e. action has not been performed successfully), and the encoded audio data may represent an audio designated to provide the indication to the user of the user input device in audible format.

The establishment of the interface configured to control the one or more software programs via received control information from the user input device may be based on presence of an established link with the user input device. In other words, the processor 1901 may establish the user input device interface based on a presence of an established link with the user input device. Accordingly, when the user connects the user input device to the computing device 1900, the processor 1901 may, in response to the established link with the user input device, execute, or parse, the input device interface 1913 stored in the memory 1902 to establish the interface.

In accordance with various aspects provided herein, the operation mode associated with the computing device 1900, or any components of the computing device 1900, may be referred to as a VI mode. In the VI mode, the computing device 1900 may perform particular operations that are, in particular, suitable for visually impaired users. The processor 1901 may execute software programs (e.g. 1911, 1912, 1915) according to various predefined accessibility settings, which may include improving text readability, increasing contrast on U/I, read out displayed texts, executing a particular software program configured to guide a user audially, etc. In the VI mode, the computing device 1900 may perform any known methods to increase accessibility for visually impaired users. In accordance with various aspects provided herein, the processor 1901 may switch the operation mode based on the establishment of the short-range wireless link with a designated user input device, or based on the establishment of the user input device interface.

Furthermore, the processor 1901 may, based on its current operation mode from a plurality of modes including the VI mode, control components of the computing device 1900, such as the I/O devices 1908, the audio interface 1904, the communication interface 1903, to operate in a low-power mode independently, or to power them down.

In various aspects, the communication interface 1903 may include a short-range wireless signal receiver configured to receive short-range wireless communication signals. The processor 1901 may also be configured to operate in a low power mode, and the processor 1901 may change its operation of the low power mode to a normal mode based on a received control signal from the short-range wireless signal receiver. The low-power mode of the processor 1901 may include an operation mode in which the processor 1901 may consume less power than it consumes in a normal operation of the computing device 1900. The low power mode of the processor 1901 may include an operation with a reduced clock frequency, a reduced supply voltage, a reduced number of processing elements included by the processor 1901. In some aspects, the processor 1901 may support a sleep mode, or a hibernation mode. In some aspects, the short-range wireless signal receiver may be a separate receiver or the short-range wireless transceiver may be configured to operate with a low duty cycle (e.g. a duty cycle of 20%).

Figure 20:
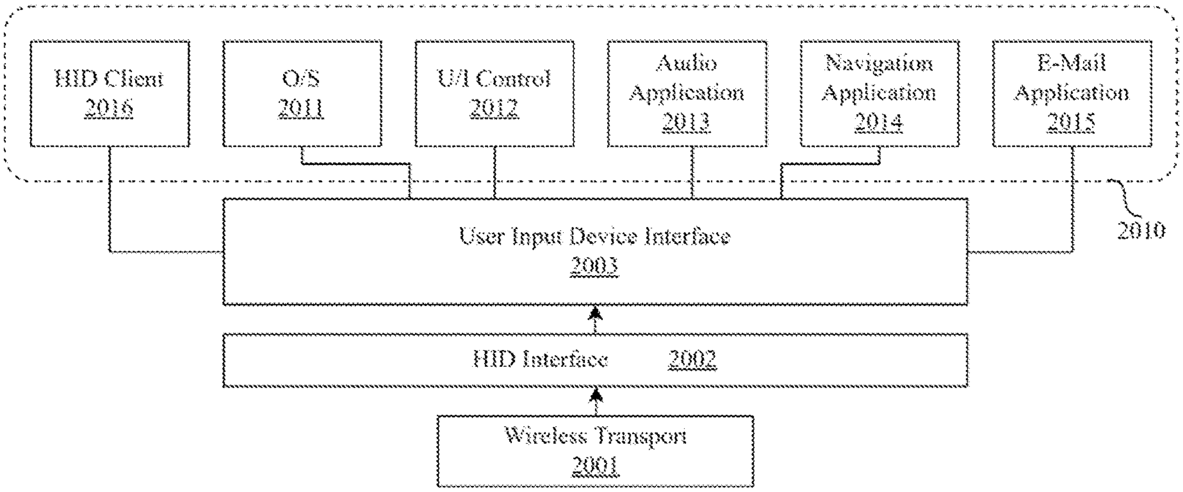
FIG. 20 shows an exemplary illustration including a user input device interface.

FIG. 20 shows an exemplary illustration including a user input device interface. A processor (e.g. the processor 1901) may perform various operations provided in accordance with this illustrative example. The processor may obtain HID reports by decoding data packets at wireless transport 2001 received from a user input device via an established short-range wireless connection. The HID interface 2002 may translate received HID reports into usable information. The HID interface 2002 may be an interface according to the HID architecture which the processor may execute over the O/S. In an example, the HID interface 2002 may include an HID transport minidriver configured to identify the respective transport and respective interface, an HID class driver which the processor may execute (i.e. an executable file) to provide mapping between received HID reports and corresponding usable information, and HID clients to provide output including usable information. On top of the HID interface, the user input device interface 2003 is deployed, which is configured to receive usable information from the HID interface and control one of the software programs 2010 which may include O/S 2011, U/I control 2012, an audio application 2013, a navigation application 2014, a mailing application 2015, or an HID client 2016. The user input device interface 2003 may access information representative of a plurality of programmable set of instructions for a plurality of possible usable informations that the HID interface 2002 may output. Based on a received usable information, the user input device interface 2003 may map the received usable information to a set of instructions to be provided to one or more software programs 2010.

For example, the user input device interface 2003 may map a received usable information including a first information to a first set of instructions that may cause the navigation application 2014 to perform an action including the steps: i) execute the navigation application, ii) set a marker to a predefined location, iii) draw a route to the set marker, iv) encode audio data representing the drawn route for audible output. Accordingly, the computing device may guide the user using the user input device to the predefined location.

In another example, the user input device interface 2003 may map a received usable information including a second information to a second set of instructions that may cause a voice communication application (not shown) to perform an action including the steps: i) execute the voice communication application, ii) establish an audio link with a predefined audio device, iii) initiate a voice call with a predefined contact, iv) stream audio associated with the voice call over the established audio link. Accordingly, the computing device may allow the user of the user input device to make a voice call via a headset connected to the computing device.

In another example, the user input device interface 2003 may map a received usable information including a third information to a third set of instructions that may cause a mailing application 2015 to perform an action including the steps: i) execute the mailing application, ii) loop for all unread emails; ii.a) open an unread email, ii.b) encode audio data based on text of opened email over the established audio link, ii.c) change to a further unread email. Accordingly, the computing device may allow the user of the user input device to listen text written in unread emails via the headset.

In another example, the user input device interface 2003 may map a received usable information including a fourth information to a fourth set of instructions that may cause an audio application 2013 to perform an action including the steps: i) execute the audio application, ii) select a predefined music channel; iii) play selected music channel; iv) encode audio data based on received audio data of the selected music channel to transmit over the established audio link. Accordingly, the computing device may allow the user of the user input device to listen music via the headset.

In another example, the user input device interface 2003 may map a received usable information including a fifth information to a fifth set of instructions that may cause an O/S to perform an action including at least one of the following: i) change the operation mode into a low power mode, ii) change the operation mode into a sleep mode, iii) change the operation mode into a hibernation mode, or iv) turn off the computing device. Accordingly, the computing device may allow the user of the user input device to control operation modes of the computing device.

It is to be noted that above mentioned examples are provided merely to represent the complexity of the corresponding set of instructions and their control over particular selected application which may include provision of the corresponding set of instructions in a predefined order in a manner which may be temporally apart from each other. The skilled person would further recognize that the set of instructions provided to each application may be based on capabilities of the application and the interface associated with the respective application, in terms of the operations can be controlled and the parameters that are to be used.

Figure 21:
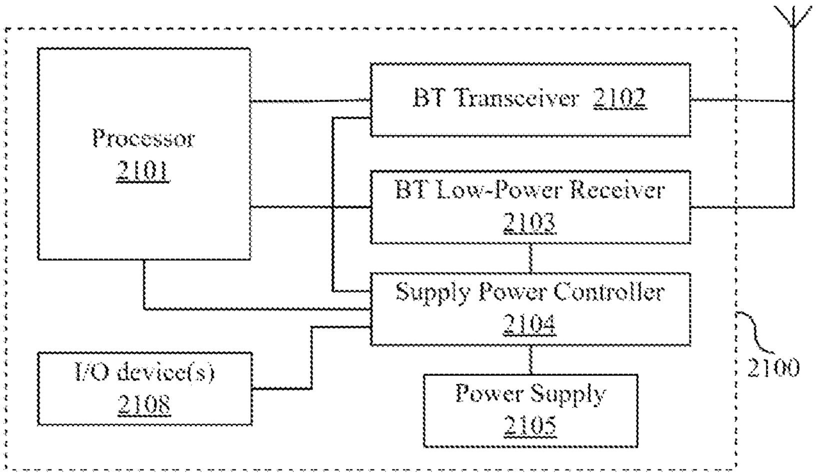
FIG. 21 shows an exemplary illustration of a computing device with various operating modes.

FIG. 21 shows an exemplary illustration of a computing device with various operating modes. The computing device may be a computing device exemplarily provided according to FIG. 19. The computing device 2100 may include a processor 2101 (e.g. the processor 1901), a communication interface that may include a BT transceiver 2101, as a short-range wireless communication receiver, configured to perform BT communication protocol to communicate with a user input device and a separate BT low-power receiver 2103. The computing device 2100 may further include, or may be coupled to, I/O devices 2108 (e.g. the I/O devices 1908). Furthermore, the computing device 2100 may include a power supply 2105 to provide supply power to various components of the computing device 2100 and a supply power controller configured to control supply power provided to components independently.

In various examples, the computing device 2100 may power down various components. The components, which may include the processor 2101, the BT transceiver 2102, the BT low-power receiver 2103, and the I/O devices 2108 and other components of the computing device 2100, may be configured to operate in a low power mode. In various examples, the low power mode of a component may be provided by the supply power controller 2104. The supply power controller 2104 may reduce the supply power provided to a particular component to cause the component to operate in a low power mode. In some examples, the supply power controller 2104 may power down a respective component.

Furthermore, the low power mode of a component may be any mode which consumes lower power than the normal mode. For example, during the low power mode, one or more components of the BT transceiver 2102 may consume low power or no power. In the low power mode, the processor 2101, or a controller of the BT transceiver 2102 according to a control signal provided by the processor 2103, may cause one or more components of the BT transceiver 2102 to be deactivated or disabled. For example, in the normal mode, the one or more amplifiers of the BT transceiver 2102 may amplify received radio communication signals with a designated gain, while in the low-power mode, the one or more amplifiers of the BT transceiver 2102 may not operate, or amplify with much less gain. In various examples, the processor 2101 may deactivate the BT transceiver 2102. Operation of other components may be similar to provided examples for the BT transceiver 2102.

The processor 2101 may determine whether a component operates in a low power mode or in a normal mode. The processor 2101 may determine components operating in a low power mode or in normal mode based on information stored in a memory, which the information represents one or more components operating in a low power mode and one or more components operating in a normal mode for each operating mode of a plurality of operation modes designated for operation of the computing device 2100. The operation modes may include the VI mode, a sleep mode, a hibernation mode, a power down mode. The processor 2101 may also operate in a low power mode. Furthermore, the processor 2101 may switch designated operating mode of the computing device 2100.

In some examples, a memory coupled to the processor 2101 may store information representing whether a component operates in a low power mode or in a normal mode for at least one of operating modes of the computing device 2100. Accordingly, the processor 2101 may cause components associated with unrequired subsystems to operate in a low power mode (e.g. powered down, turned off). Accordingly, extra power savings may be achieved.

In some aspects, the BT low-power receiver 2103 may be configured to operate in low power consumption. This may include a simple receiver 2103 that may be configured to receive BT communication signals and detect a predefined signal pattern or bit pattern (e.g. data sequence). The signal pattern and the bit pattern may be collectively referred to as pattern in this disclosure. The respective pattern may be designated before the operation, during manufacturing, or via establishment of the communication link with the user input device. Based on a detection of the predefined pattern, the BT low-power receiver 2103 may send a predefined signal to the processor 2101. The signal may represent the detection of the predefined pattern. The processor 2101 may be configured to receive the predefined signal in a low-power mode of the processor 2101, and based on reception of the predefined signal from the BT low-power receiver 2103, the processor 2101 may change the operating mode of the computing device 2100. In some examples, the BT low-power receiver 2103 may send the predefined signal to the supply power controller 2104, and the supply power controller 2104 may provide a predefined supply voltage to the processor 2101 to wake up the processor 2101. The processor 2101 may accordingly change the operating mode of the computing device.

Figure 22:
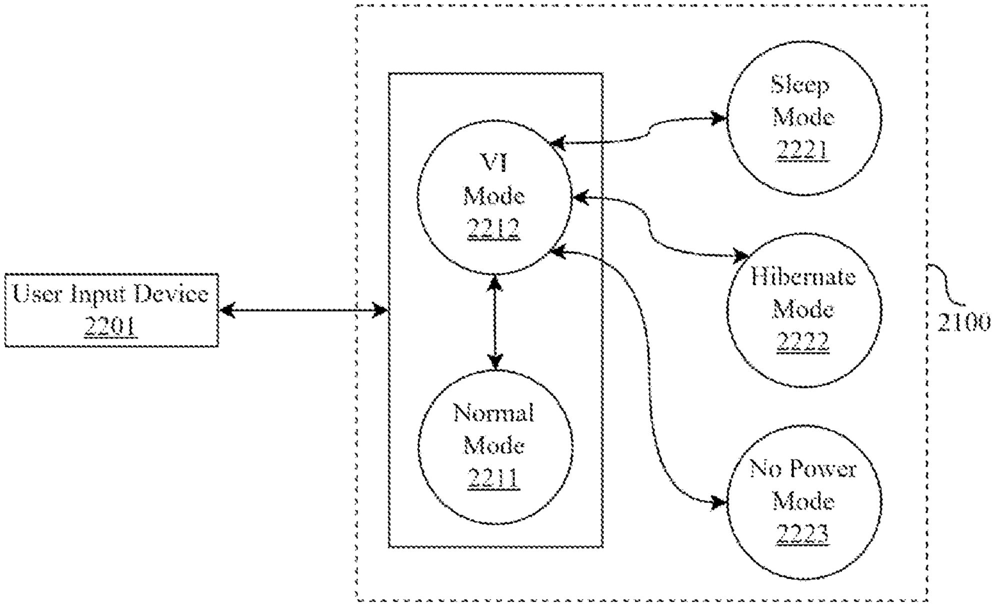
FIG. 22 shows an exemplary illustration including operating modes of a computing device.

FIG. 22 shows an exemplary illustration including operating modes of a computing device. The aspects are provided herein collectively with respect to FIG. 21 for the computing device 2100. An operating state of the computing device 2100 may include a normal mode 2211. During the normal mode 2211, the computing device 2100 may operate as an ordinary computing device. Based on an established connection with the user input device 2201, the processor 2101 may switch the operating mode of the computing device 2100 into the VI mode 2212 for which some aspects are provided in this disclosure, which may include improved accessibility settings designated for a visually impaired user. In the VI mode 2212, the processor may establish the user input device interface. The established user input interface may include loading input interface (e.g. the input interface 1915) into a random access memory (RAM) of the computing device 2100 and the processor 2101 may accordingly execute the loaded information as necessary.

In various aspects, the processor may cause one or more predefined I/O devices 2108 to operate in a low-power mode. For example, one of the I/O devices 2108 that may operate in the low power mode during the VI mode 2212 may include a display of the computing device 2100. Similarly, further I/O devices 2108, such as a further keyboard, a mouse, etc. may operate in the low power mode. The low power mode may include a mode in which the respective I/O devices 2108 may be powered down (i.e. turned off). In the VI mode 2212, the processor 2101 may monitor activity of predefined software programs, and based on predefined switching condition (e.g. no activity for all predefined software programs for X minutes) or based on a received designated instruction, the processor 2101 may determine to change the operating mode of the computing device to one of the sleep mode 2221, the hibernate mode 2222, or the power down mode 2223. Accordingly, in the VI mode 2212, the BT transceiver 2102 may operate in a normal mode. In this mode, the BT low-power receiver 2103 may operate in a low power mode.

In the sleep mode 2221, the processor 2101 may maintain the established link with the user input device 2201. Accordingly, in the sleep mode 2221, the BT transceiver 2102 may operate in the normal mode and the BT low-power receiver 2103 may operate in the low power mode. The processor 2101 may also maintain the established user input device interface. Accordingly, the input interface may remain loaded in the RAM. In the sleep mode 2221, the processor 2101 may enter into a first low power mode, in which the O/S and applications may still run. The first low power mode may be a low power mode in which the processor 2101 may operate with a decreased performance (e.g. reduced clock frequency, reduced supply voltage, etc.). In some aspects, the processor 2201 may monitor predefined software programs to detect predefined activities and switch the operating mode of the computing device 2100 to the VI mode 2212. The predefined activities may include an incoming email, an incoming notification associated with battery, an incoming call, a triggered alarm, a computing device upgrade information, etc. In some aspects, the processor 2201 may switch to the hibernate mode 2222 due to lack of activity, or a received instruction from the user. The processor 2101 may further cause further components of the computing device 2100 to operate in a low power mode.

In the hibernate mode 2222, or in the power down mode 2223, the processor 2101 may disconnect the established link with the user input device 2201. The processor 2101 may accordingly cause the BT transceiver 2102 to operate in a low power mode. The processor 2101 may further cause the BT low-power receiver 2103 to operate in a normal mode. During the normal mode, the BT low-power receiver 2103 may receive BT communication signals from the user input device 2201 and may cause the computing device to switch into the VI mode 2212 or into the sleep mode 2221 in response to detection of a signal pattern.

In some examples, the functions provided here by the BT low-power receiver 2103 may be provided by the BT transceiver 2102. In the hibernate mode 2222, the BT transceiver 2102 may operate in a low power mode with a reduced duty cycle (e.g. a duty cycle of 20%). In such an example, the BT transceiver 2102 may perform a scan for advertisements packets with a low duty cycle (e.g. a duty cycle of 20%). Based on a detection of an advertisement packet sent by the user input device 2201, the BT transceiver 2102 may send a predefined signal representative of detection of the user input device 2201. In some examples, the processor 2101 may operate in a low power mode, in which the processor 2101 may decode received advertisement packets. In some examples, the advertisement packets may include predefined data sequence.

The provided examples here with respect to the aspects associated with low-power BT receiver 2103 and the BT transceiver 2102 are to be considered exemplary. In some examples, the computing device 2100 may include any short-range wireless communication transceiver to communicate with the user input device 2201. The respective short-range wireless communication transceiver may cause the processor 2101 to change the operating mode from the hibernate mode 2222 or the power down mode 2223 into the VI mode 2212 based on detection of received packets (such as a broadcast beacon). The short-range wireless communication transceiver may operate based on a designated low duty cycle, which may be 20% of duty cycle. In some examples, the computing device 2100 may include a low-power short range wireless communication receiver to cause the processor 2101 to change the operating mode from the hibernate mode 2222 or the power down mode 2223 into the VI mode 2212 based on a detection received signal pattern or data sequence.

Accordingly, in response to detection of the user input device 2201, the processor 2101 may change the operating mode of the computing device 2100 into the VI mode 2212. Furthermore, the processor 2101 may establish a BT connection with the user input device 2201 and the processor 2101 may establish the user input device interface.

Figure 23:
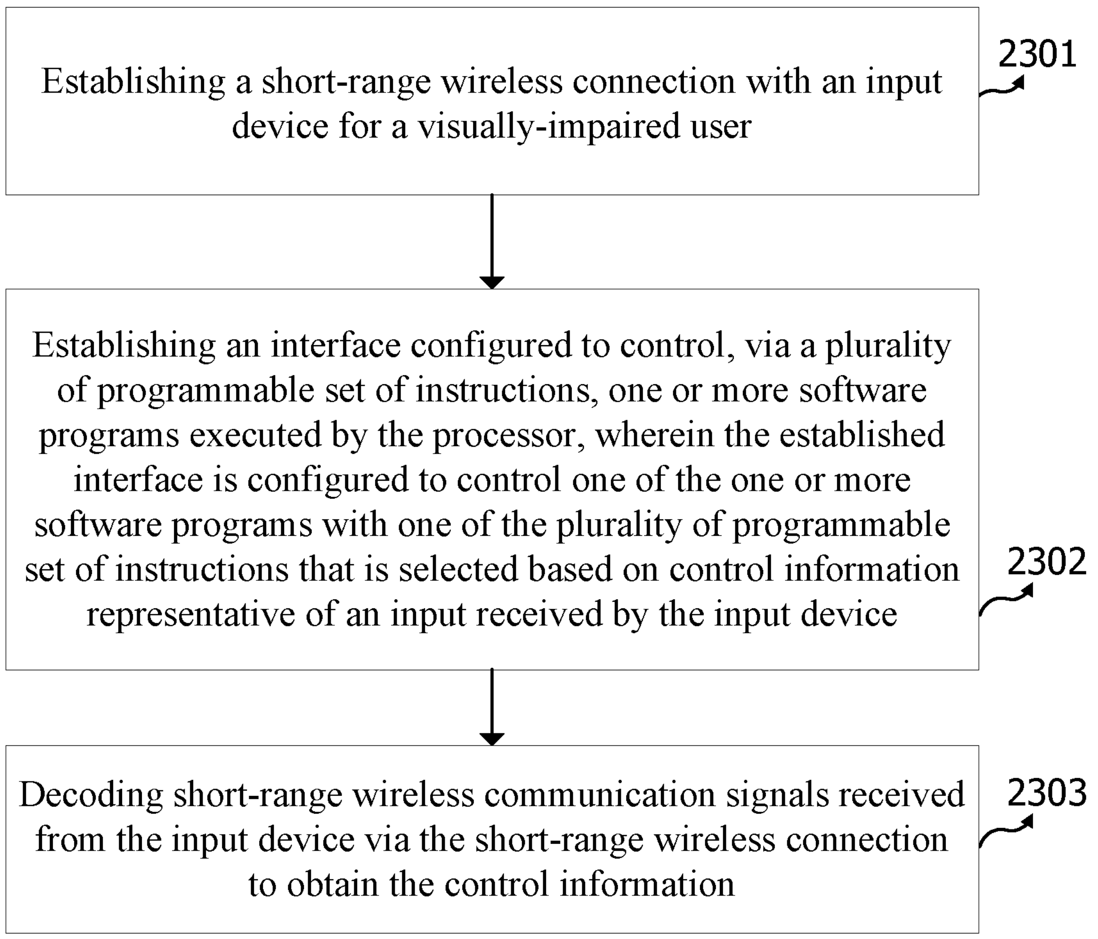
FIG. 23 shows an example of a method.

FIG. 23 shows an example of a method. The method may include establishing 2301 a short-range wireless connection with an input device for a visually-impaired user, establishing 2302 an interface configured to control, via a plurality of programmable set of instructions, one or more software programs executed by the processor, wherein the established interface is configured to control one of the one or more software programs with one of the plurality of programmable set of instructions that is selected based on control information representative of an input received by the input device, and decoding 2303 short-range wireless communication signals received from the input device via the short-range wireless connection to obtain the control information.

The following examples pertain to further aspects of this disclosure.

In example 1A, the subject matter includes an apparatus for a communication device, the apparatus may include: a processor configured to: obtain channel metrics for a plurality of radio communication channels, each obtained channel metric is associated with a respective radio communication channel of the plurality of radio communication channels; generate a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric; select one of the plurality of channel hopping sequences based on a predefined criterion to communicate with a further communication device.

In example 2A, the subject matter of example 1A, can optionally include that the selected channel hopping sequence is configured to cause the communication device to use respective radio communication channels at respective time slots to communicate with the further communication device. In example 3A, the subject matter of example 1A or example 2A, can optionally include that the predefined criterion is based on calculated entropies for each generated channel hopping sequence. In example 4A, the subject matter of any one of examples 1A to 3A, can optionally include that the predefined criterion is based on estimated throughputs for each generated channel hopping sequence.

In example 5A, the subject matter of example 4A, can optionally include that the predefined criterion is based on a weighed combination of a first metric associated with the calculated entropy and a second metric associated with the estimated throughput for each generated channel hopping sequence. In example 6A, the subject matter of any one of examples 1A to 5A, can optionally include that the processor is configured to generate the plurality of hopping sequences using a pinwheel scheduling algorithm configured to schedule the plurality of radio communication channels into the plurality of time slots. In example 7A, the subject matter of example 6A, can optionally include that the processor is further configured to, for an N number of the plurality of radio communication channels, generate a plurality of different repetition interval sets that are schedulable, each repetition interval set includes N number of integers ranked in a predefined order, each integer is representative of a number of occurrences within a plurality of occurrences; can optionally include that the processor is further configured to generate a ranked channel set that may include information representative of the plurality of radio communication channels that are ranked in the predefined order, wherein the plurality of radio communication channels are ranked based on their respective obtained channel metric.

In example 8A, the subject matter of example 6A or example 7A, can optionally include that the schedulable criterion associated with the generation of the plurality of different repetition interval sets includes the density associated with a respective repetition interval set being equal or smaller than 0.5, wherein the density includes a summation of multiplicative inverse of each integer of the repetition interval set. In example 9A, the subject matter of any one of examples 6A to 8A, can optionally include that the processor is further configured to generate the plurality of different repetition interval sets based on a plurality of different seed values, each seed value is configured to set the highest number of occurrence in the plurality of occurrences for the respective repetition interval set. In example 10A, the subject matter of any one of examples 6A to 9A, can optionally include that the processor is further configured to generate the plurality of channel hopping sequences according to a greedy algorithm applied based on each of the plurality of different repetition interval sets and the ranked channel set.

In example 11A, the subject matter of example 10A, can optionally include that each generated channel hopping sequence is representative of the plurality of time slots allocated for the plurality of radio communication channels, such that each radio communication channel is allocated to the number of time slots that is based on the respective integer of the respective repetition interval set. In example 12A, the subject matter of example 10A or example 11A, can optionally include that the processor is further configured to obtain a candidate channel hopping sequence according to the greedy algorithm applied based on one of the plurality of different interval sets and the ranked channel set; can optionally include that the processor is further configured to remap at least one of the time slots from a first radio communication channel of the plurality of radio communication channels to a second radio communication channel of the plurality of radio communication channels of the candidate channel hopping sequence based on the obtained channel metric associated with the first radio communication channel and the second communication channel. In example 13A, the subject matter of any one of examples 10A to 12A, can optionally include that the processor is further configured to determine to remap the at least one of the time slots based on the obtained channel metric associated with the respective radio communication channel allocated for the at least one of the time slot and a predetermined channel metric threshold.

In example 14A, the subject matter of any one of examples 1A to 13A, can optionally include that the processor is further configured to obtain a channel map including the channel metrics for the plurality of radio communication channels. In example 15A, the subject matter of example 14A, can optionally include that each obtained channel metric associated with the respective radio communication channel is based on at least one of channel measurements such as a signal to noise ratio or a received signal strength indicator (RSSI), a packet error rate (PER), a bit error rate (BER), presence of radio communication channels associated with other radio access technologies, an estimated network traffic classification, a quality of service (QoS) metric, measurement reports received from other communication devices.

In example 16A, the subject matter of any one of examples 1A to 15A, can optionally include that the processor is further configured to select a first plurality of radio communication channels to communicate with a first communication device and a second plurality of radio communication channels to communicate with a second communication device from available radio communication channels; can optionally include that the processor is further configured to generate a first set of channel hopping sequences to allocate the first plurality of radio communication channels and to generate a second set of channel hopping sequences to allocate the second plurality of radio communication channels. In example 17A, the subject matter of any one of examples 1A to 16A, can optionally include that the processor is further configured to select the plurality of radio communication channels from available radio communication channels.

In example 18A, the subject matter of any one of examples 1A to 17A, can optionally include that the plurality of radio communication channels are Bluetooth communication channels. In example 19A, the subject matter of any one of examples 1A to 18A, can optionally include that the plurality of time slots includes a plurality of consecutive time slots. In example 20A, the subject matter of any one of examples 1A to 19A, can optionally include that the generated plurality of channel hopping sequences is representative of the allocation of the plurality of radio communication channels for the plurality of time slots to be used to communicate with a peripheral device. In example 21A, the subject matter of any one of examples 1A to 20A, further may include a transceiver configured to communicate with the further communication device via the plurality of radio communication channels; can optionally include that the processor is further configured to control the transceiver to communicate with the further communication device based on the selected channel hopping sequence.

In example 22A, the subject matter of any one of examples 1A to 21A, can optionally include that the processor is further configured to encode information representative of the selected channel hopping sequence for a transmission to the further communication device. In example 23A, the subject matter of any one of examples 1 to 22A, further may include a measurement circuit configured to perform measurements associated with at least one of the plurality of radio communication channels to obtain channel metrics.

In example 24A, the subject matter includes a method that may include: obtaining channel metrics for a plurality of radio communication channels, each obtained channel metric is associated with a respective radio communication channel of the plurality of radio communication channels; generating a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric; selecting one of the plurality of channel hopping sequences based on a predefined criterion to communicate with a further communication device.

In example 25A, the subject matter of example 24A, further may include: causing, according to the selected channel hopping sequence, the communication device to use respective radio communication channels at respective time slots to communicate with the further communication device. In example 26A, the subject matter of example 24A or example 25A, can optionally include that the predefined criterion is based on calculated entropies for each generated channel hopping sequence. In example 27A, the subject matter of any one of examples 24A to 26A, can optionally include that the predefined criterion is based on estimated throughputs for each generated channel hopping sequence. In example 28A, the subject matter of example 27A, can optionally include that the predefined criterion is based on a weighed combination of a first metric associated with the calculated entropy and a second metric associated with the estimated throughput for each generated channel hopping sequence.

In example 29A, the subject matter of any one of examples 24A to 29A, further may include: generating the plurality of hopping sequences using a pinwheel scheduling algorithm configured to schedule the plurality of radio communication channels into the plurality of time slots. In example 30A, the subject matter of example 29A, further may include: generating, for an N number of the plurality of radio communication channels, a plurality of different repetition interval sets that are schedulable, each repetition interval set includes N number of integers ranked in a predefined order, each integer is representative of a number of occurrences within a plurality of occurrences; generating a ranked channel set that may include information representative of the plurality of radio communication channels that are ranked in the predefined order, wherein the plurality of radio communication channels are ranked based on their respective obtained channel metric.

In example 31A, the subject matter of example 29A or example 30A, can optionally include that the schedulable criterion associated with the generation of the plurality of different repetition interval sets includes the density associated with a respective repetition interval set being equal or smaller than 0.5, wherein the density includes a summation of multiplicative inverse of each integer of the repetition interval set. In example 32A, the subject matter of any one of examples 29A to 31A, further may include: generating the plurality of different repetition interval sets based on a plurality of different seed values, each seed value is configured to set the highest number of occurrence in the plurality of occurrences for the respective repetition interval set. In example 33A, the subject matter of any one of examples 29A to 32A, further may include: generating the plurality of channel hopping sequences according to a greedy algorithm applied based on each of the plurality of different repetition interval sets and the ranked channel set.

In example 34A, the subject matter of example 33A, can optionally include that each generated channel hopping sequence is representative of the plurality of time slots allocated for the plurality of radio communication channels, such that each radio communication channel is allocated to the number of time slots that is based on the respective integer of the respective repetition interval set. In example 35A, the subject matter of example 33A or example 34A, further may include: obtaining a candidate channel hopping sequence according to the greedy algorithm applied based on one of the plurality of different interval sets and the ranked channel set; remapping at least one of the time slots from a first radio communication channel of the plurality of radio communication channels to a second radio communication channel of the plurality of radio communication channels of the candidate channel hopping sequence based on the obtained channel metric associated with the first radio communication channel and the second communication channel.

In example 36A, the subject matter of any one of examples 33A to 35A, further may include: determining to remap the at least one of the time slots based on the obtained channel metric associated with the respective radio communication channel allocated for the at least one of the time slot and a predetermined channel metric threshold. In example 37A, the subject matter of any one of examples 24A to 36A, further may include: obtaining a channel map including the channel metrics for the plurality of radio communication channels. In example 38A, the subject matter of example 37A, can optionally include that each obtained channel metric associated with the respective radio communication channel is based on at least one of channel measurements such as a signal to noise ratio or a received signal strength indicator (RSSI), a packet error rate (PER), a bit error rate (BER), presence of radio communication channels associated with other radio access technologies, an estimated network traffic classification, a quality of service (QoS) metric, measurement reports received from other communication devices.

In example 39A, the subject matter of any one of examples 24A to 38A, further may include: selecting a first plurality of radio communication channels to communicate with a first communication device and a second plurality of radio communication channels to communicate with a second communication device from available radio communication channels; generating a first set of channel hopping sequences to allocate the first plurality of radio communication channels and to generate a second set of channel hopping sequences to allocate the second plurality of radio communication channels. In example 40A, the subject matter of any one of examples 24A to 39A, further may include: selecting the plurality of radio communication channels from available radio communication channels. In example 41A, the subject matter of any one of examples 24A to 40A, can optionally include that the plurality of radio communication channels are Bluetooth communication channels.

In example 42A, the subject matter of any one of examples 24A to 41A, can optionally include that the plurality of time slots includes a plurality of consecutive time slots. In example 43A, the subject matter of any one of examples 24A to 42A, can optionally include that the generated plurality of channel hopping sequences is representative of the allocation of the plurality of radio communication channels for the plurality of time slots to be used to communicate with a peripheral device. In example 44A, the subject matter of any one of examples 24A to 43A, further may include: communicating with the further communication device via the plurality of radio communication channels; controlling a transceiver to communicate with the further communication device based on the selected channel hopping sequence. In example 45A, the subject matter of any one of examples 24A to 44A, further may include: encoding information representative of the selected channel hopping sequence for a transmission to the further communication device. In example 46A, the subject matter of any one of examples 24A to 45A, further may include: performing measurements associated with at least one of the plurality of radio communication channels to obtain channel metrics.

In example 47A, a non-transitory computer-readable medium may include one or more instructions which, if executed by a processor, cause the processor to: obtain channel metrics for a plurality of radio communication channels, each obtained channel metric is associated with a respective radio communication channel of the plurality of radio communication channels; generate a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric; select one of the plurality of channel hopping sequences based on a predefined criterion to communicate with a further communication device. In example 48A, the non-transitory computer-readable medium may include one or more instructions which, if executed by a processor, cause the processor to perform the method of any one of examples 24A to 46A.

In example 49A, an apparatus for a communication device, the apparatus may include: a processor configured to: obtain a plurality of channel quality information for a plurality of radio communication channels, each channel quality information is configured to represent the channel quality of a respective radio communication channel of the plurality of radio communication channels; select, based on a predefined criterion, a channel hopping sequence from a plurality of channel hopping sequences generated to perform communications with a further communication device, wherein each generated channel hopping sequence is representative an allocation associated with the plurality of radio communication channels to a plurality of time slots and wherein a number of time slots allocated for each radio communication channel within each channel hopping sequence is based on the respective channel quality information. In example 50A, the apparatus of example 49A, can optionally include that the apparatus is further configured to perform any one of aspects provided in this disclosure, in particular aspects provided in examples 1A to 23A.

In example 1B, the subject matter may include an apparatus for a Bluetooth peripheral device, the apparatus may include: a processor configured to: encode data for transmissions via an established synchronous link selectively by encoding audio data packets based on received audio input or by encoding NULL data packets; determine whether a transmission is to include an encoded audio packet or an encoded NULL data packet based on decoded information within a packet header of a decoded data packet received via the established synchronous link.

In example 2B, the subject matter of example 1B, can optionally include that the established synchronous link includes an extended synchronous connection orientated (eSCO) link. In example 3B, the subject matter of example 1B or example 2B, can optionally include that the decoded information includes a flow bit. In example 4B, the subject matter of any one of examples 1B to 3B, can optionally include that the processor is further configured to determine that the transmission is to include the encoded audio packet if the decoded flow bit is 1, and that the transmission is to include the encoded NULL packet if the decoded flow bit is 0.

In example 5B, the subject matter of any one of examples 1B to 4B, can optionally include that the processor is further configured to determine that the transmission is to include the encoded audio packet based on a received user interaction independent from the decoded information. In example 6B, the subject matter of any one of examples 1B to 5B, can optionally include that the data packet received via the established synchronous link is includes the latest received data packet via the established synchronous link. In example 7B, the subject matter of any one of examples 1B to 6B, can optionally include that the processor is further configured to decode the data packet received via the established synchronous link to obtain the decoded information.

In example 8B, the subject matter of any one of examples 1B to 7B, may further include: an audio interface with an audio input device configured to provide audio input; can optionally include that the processor is further configured to provide an output representative of the decoded information to the audio interface. In example 9B, the subject matter of example 8B, can optionally include that the processor is further configured to receive the audio input from the audio interface; can optionally include that the processor is further configured to deactivate the audio interface based on the decoded information. In example 10B, the subject matter of example 8B or example 9B, may further include: the audio input device configured to operate in a low-power operation mode; can optionally include that the processor is further configured to cause the audio input device to operate in the low-power operation mode based on the decoded information.

In example 11B, the subject matter of example 10B, can optionally include that the processor is further configured to cause the audio input device to switch back to a normal mode from the low-power operation mode based on the decoded information. In example 12B, the subject matter of example 10B or example 11B, can optionally include that the audio input device includes an audio input device circuit may include one or more components; can optionally include that the processor is further configured to cause the one or more components to be disabled or deactivated based on the decoded information. In example 13B, the subject matter of any one of examples 10B to 12B, may further include: a supply power controller; can optionally include that the audio input device is coupled to a power supply configured to provide a supply power controlled by the supply power controller to the audio input device; can optionally include that the processor is further configured to control the supply power controller based on the decoded information.

In example 14B, the subject matter of any one of examples 1B to 13B, may further include: an audio output device; can optionally include that the processor is further configured to provide audio output based on decoded data packets received from the established synchronous link to the audio output device. In example 15B, the subject matter of any one of examples 1B to 14B, may further include: may further include a user input device configured to receive user interactions; can optionally include that the processor is further configured to determine whether the transmission is to include the encoded audio packet or the encoded NULL data packet based on received user interaction.

In example 16B, the subject matter includes a method that may include: encoding data for transmissions via an established synchronous link selectively by encoding audio data packets based on received audio input or by encoding NULL data packets; determining whether a transmission is to include an encoded audio packet or an encoded NULL data packet based on decoded information within a packet header of a decoded data packet received via the established synchronous link.

In example 17B, the subject matter of example 16B, can optionally include that the established synchronous link includes an extended synchronous connection orientated (eSCO) link. In example 18B, the subject matter of example 16B or example 17B, can optionally include that the decoded information includes a flow bit. In example 19B, the subject matter of any one of examples 16B to 18B, may further include: determining that the transmission is to include the encoded audio packet if the decoded flow bit is 1, and that the transmission is to include the encoded NULL packet if the decoded flow bit is 0.

In example 20B, the subject matter of any one of examples 16B to 19B, may further include: determining that the transmission is to include the encoded audio packet based on a received user interaction independent from the decoded information. In example 21B, the subject matter of any one of examples 16B to 20B, can optionally include that the data packet received via the established synchronous link is includes the latest received data packet via the established synchronous link. In example 22B, the subject matter of any one of examples 16B to 21B, may further include: decoding the data packet received via the established synchronous link to obtain the decoded information.

In example 23B, the subject matter of any one of examples 16B to 22B, may further include: providing an output representative of the decoded information to an audio interface. In example 24B, the subject matter of example 23B, may further include: receiving the audio input from the audio interface; deactivating the audio interface based on the decoded information. In example 25B, the subject matter of example 23B or example 24B, may further include: causing the audio input device to operate in the low-power operation mode based on the decoded information. In example 26B, the subject matter of example 25B, causing the audio input device to switch back to a normal mode from the low-power operation mode based on the decoded information.

In example 27B, the subject matter of example 25B or example 26B, may further include: can optionally include that the audio input device includes an audio input device circuit may include one or more components; can optionally include that the method further includes causing the one or more components to be disabled or deactivated based on the decoded information. In example 28B, the subject matter of any one of examples 25B to 27B, may further include: can optionally include that the audio input device is coupled to a power supply configured to provide a supply power controlled by the supply power controller to the audio input device; can optionally include that the method further includes controlling a supply power controller based on the decoded information.

In example 29B, the subject matter of any one of examples 16B to 28B, may further include: providing audio output based on decoded data packets received from the established synchronous link to an audio output device. In example 30B, the subject matter of any one of examples 16B to 29B, may further include: determining whether the transmission is to include the encoded audio packet or the encoded NULL data packet based on received user interaction.

In example 31B, a non-transitory computer-readable medium may include one or more instructions which, if executed by a processor, cause the processor to: encode data for transmissions via an established synchronous link selectively by encoding audio data packets based on received audio input or by encoding NULL data packets; determine whether a transmission is to include an encoded audio packet or an encoded NULL data packet based on decoded information within a packet header of a decoded data packet received via the established synchronous link. In example 32B, a non-transitory computer-readable medium may include one or more instructions which, if executed by a processor, cause the processor to perform the method of any one of examples 16B to 30B.

In example 33B, a Bluetooth headset may include: the apparatus of any one of examples 1B to 15B, a microphone configured to provide the audio input.

In example 34B, the subject matter includes an apparatus for a Bluetooth device, the apparatus may include: a processor configured to: decode data packets received in allocated receive time slots via an established synchronous link; encode data packets for transmissions via the established synchronous link into transmit time slots, each transmit time slot is configured to follow one of the allocated receive time slots; determine, for each transmit slot, whether to encode an audio data packet or a NULL data packet based on information included in a packet header of a decoded data packet received in the respective allocated receive time slot. The example 34B may further include any aspects provided in this disclosure, in particular aspects provided for examples 1B to 15B.

In example 35B, the subject matter includes an apparatus for a Bluetooth central device, the apparatus may include: a processor configured to: determine a determination result representative of whether an audio input is expected or not from a peripheral device; encode data packets for transmissions to the peripheral device connected over an established synchronous link to communicate audio data, can optionally include that each data packet includes a packet header may include information that is set based on the determination result.

In example 36B, the subject matter of example 35B, can optionally include that the established synchronous link includes an extended synchronous connection orientated (eSCO) link. In example 37B, the subject matter of example 35B or example 36B, can optionally include that the information includes a flow bit. In example 38B, the subject matter of any one of examples 35B to 37B, can optionally include that the processor is further configured to set the flow bit to 1 if the determination result is representative of an expectation of the audio input, and to set the flow bit to 0 if the determination result is representative of no expectation of the audio input.

In example 39B, the subject matter of any one of examples 35B to 38B, can optionally include that the processor is further configured to determine the determination result based on a received user interaction. In example 40B, the subject matter of any one of examples 35B to 39B, can optionally include that the processor is further configured to determine the determination result based on data received from the peripheral device.

In example 41B, the subject matter includes a method that may include: determining a determination result representative of whether an audio input is expected or not from a peripheral device; encoding data packets for transmissions to the peripheral device connected over an established synchronous link to communicate audio data, can optionally include that each data packet includes a packet header may include information that is set based on the determination result.

In example 42B, the subject matter of example 41B, can optionally include that the established synchronous link includes an extended synchronous connection orientated (eSCO) link. In example 43B, the subject matter of example 41B or example 42B, can optionally include that the information includes a flow bit. In example 44B, the subject matter of any one of examples 41B to 43B, may further include: setting the flow bit to 1 if the determination result is representative of an expectation of the audio input, and to set the flow bit to 0 if the determination result is representative of no expectation of the audio input. In example 45B, the subject matter of any one of examples 41B to 44B, may further include: determining the determination result based on a received user interaction. In example 46B, the subject matter of any one of examples 41B to 45B, may further include: determining the determination result based on data received from the peripheral device.

In example 47B, a non-transitory computer-readable medium may include one or more instructions which, if executed by a processor, cause the processor to: determine a determination result representative of whether an audio input is expected or not from a peripheral device; encode data packets for transmissions to the peripheral device connected over an established synchronous link to communicate audio data, can optionally include that each data packet includes a packet header may include information that is set based on the determination result. In example 48B, a non-transitory computer-readable medium may include one or more instructions which, if executed by a processor, cause the processor to perform the method of any one of examples 41B to 46B.

In example 49B, an apparatus for a Bluetooth device, may include: a memory configured to store peripheral information representative of whether a peripheral device is muted or not; a processor configured to: generate packet headers for data packets for transmissions to the peripheral device connected over an established synchronous link, can optionally include that each packet header generated for a transmission in an allocated time slot includes information, based on the stored peripheral information, representative of whether an audio data is expected from the peripheral device in a following time slot allocated for a transmission of the peripheral device. In example 50B, the apparatus of example 49B, can optionally include that the apparatus is further configured to perform any one of aspects provided in this disclosure, in particular aspects provided in any one of examples 35B to 40B.

In example 1C, the subject matter includes a computing device may include: a processor configured to: establish a short-range wireless connection with an input device for a visually-impaired user; establish an interface configured to control, via a plurality of programmable set of instructions, one or more software programs executed by the processor, wherein the established interface is configured to control one of the one or more software programs with one of the plurality of programmable set of instructions that is selected based on control information representative of an input received by the input device; decode short-range wireless communication signals received from the input device via the short-range wireless connection to obtain the control information.

In example 2C, the subject matter of example 1C, can optionally include that the processor is further configured to encode audio data, based on output of the one or more software programs in response to the provided set of instructions, for a transmission via a second established short-range wireless connection to an audio output device. In example 3C, the subject matter of example 1C or example 2C, can optionally include that each set of instructions includes a plurality of instructions that are configured to control one of the software programs to perform a predefined action. In example 4C, the subject matter of example 3C, can optionally include that the interface is further configured to provide the plurality of instructions based on a predefined order to cause the one of the software programs to perform the predefined action.

In example 5C, the subject matter of any one of examples 1C to 4C, can optionally include that the computing device is configured to operate in a first operation mode in which the processor is configured to establish the short-range wireless connection, establish the interface configured to control the one or more software programs executed by the processor via the plurality of programmable set of instructions, and decode the short-range wireless communication signals; can optionally include that the processor is further configured switch to the first operation mode in response to a received instruction. In example 6C, the subject matter of example 5C, can optionally include that the processor is further configured to cause one or more connected output devices to operate in a low power mode within the first operation mode; can optionally include that the one or more connected output devices include a display.

In example 7C, the subject matter of example 5C or example 6C, can optionally include that the processor is further configured to establish a further short-range wireless connection with an audio device within the first operation mode; can optionally include that the processor is further configured to exchange audio data with the audio device over the established further short-range wireless connection. In example 8C, the subject matter of any one of examples 5C to 7C, may further include: one or more devices, can optionally include that the one or more devices include one or more further input devices or one or more output devices; can optionally include that the processor is further configured to switch the operation mode of the computing device into a second operation mode; can optionally include that the one or more devices are configured to operate in a low-power mode within the second operation mode, and in some examples the processor is further configured to switch operation modes of one or more predefined components of the computing device, when the computing device operates in the second operation mode.

In example 9C, the subject matter of example 8C, can optionally include that the processor is further configured to monitor activity of the one or more software programs executed by the processor within the second operation mode; can optionally include that the processor is further configured to switch the operation mode of the computing device into the first operation mode based on the monitored activity. In example 10C, the subject matter of example 8C or example 9C, can optionally include that the processor is configured to switch the operation mode of the computing device into the second operation mode in response to at least one of a predefined control information received from the input device or a received instruction. In example 11C, the subject matter of any one of examples 8 to 10C, can optionally include that the processor is further configured to switch the operation mode of the computing device into a low-power mode; can optionally include that the processor is further configured to disconnect the established short-range wireless connection when the computing device operates into the low-power mode, and optionally the processor is further configured operate in a low-power mode when the computing device is into the low-power mode.

In example 12C, the subject matter of example 11C, may further include a short-range wireless signal receiver configured to receive short-range wireless communication signals from the input device within the low-power mode of the computing device; can optionally include that the short-range wireless signal receiver is further configured to wake up the computing device from the low-power mode based on a received short-range wireless communication signal. In example 13C, the subject matter of example 12C, can optionally include that the short-range wireless signal receiver is further configured to detect a data sequence designated for the input device from received short-range wireless communication signals.

In example 14C, the subject matter of example 12C or example 13C, can optionally include that the short-range wireless communication signals include Bluetooth communication signals; can optionally include that the short-range wireless signal receiver is further configured to scan for advertisement packets; can optionally include that the short-range wireless signal receiver is further configured to send a signal representative of a detection of the input device based on a received advertisement packet may include the data sequence designated for the input device. In some examples, the subject matter of example 12C or example 13C may include that the short-range wireless signal receiver is further configured to scan for beacons associated with the short-range wireless communication technology and send a signal representative of a detection of the input device based on a received beacon. In example 15C, the subject matter of any one of examples 12C to 14C, can optionally include that the short-range wireless signal receiver includes a processing circuitry configured to decode received Bluetooth communication signals.

In some examples, the subject matter of any one of examples 12C to 14C, can optionally include that the short-range wireless signal receiver is coupled to the processor, and the processor is configured to control operation of the short-range wireless signal receiver such that the short-range wireless signal receiver operates in a low power mode, or in a turned off mode.

In example 16C, the subject matter of example 15C, can optionally include that the short-range wireless signal receiver is further configured to perform a low-duty cycle scanning procedure for Bluetooth low energy communication signals. In some examples, the subject matter of examples 12C to 15C, can optionally include that the short-range wireless signal receiver includes a processing circuitry configured to decode received short-range wireless communication signal, and the short-range wireless signal receiver is further configured to operate based on a designated low-duty cycle to scan for short-range wireless communication signals. In example 17C, the subject matter of example 16C, can optionally include that the low-duty cycle scanning procedure includes a duty cycle of 20%. In example 18C, the subject matter of any one of examples 12C to 17C, can optionally include that the processor is further configured to establish the interface configured to control, via the plurality of programmable set of instructions, the one or more software programs executed by the processor based on an information received from the short-range wireless signal receiver. In example 19C, the subject matter of any one of examples 12C to 18C, can optionally include that the processor is further configured to establish a new connection with the input device based on the information received from the short-range wireless signal receiver. In some examples, the subject matter of any one of examples 12C to 18C, can optionally include that the short-range wireless signal receiver is configured to cause the processor to change the operating mode of the computing device based on detected signal patterns or data sequence.

In example 20C, the subject matter of any one of examples 1 to 19C, can optionally include that one of the set of instructions is configured to control a navigation software program to navigate the visually-impaired user to a predefined location from a current location. In example 21C, the subject matter of example 20C, can optionally include that the audio data includes audio instructions to guide the visually-impaired user from the current location to the predefined location. In example 22C, the subject matter of any one of examples 1 to 21C, can optionally include that the input device includes a braille keyboard configured to send control information via short-range wireless communication.

In example 23C, a method may include: establishing a short-range wireless connection with an input device for a visually-impaired user; establishing an interface configured to control, via a plurality of programmable set of instructions, one or more software programs executed by the processor, wherein the established interface is configured to control one of the one or more software programs with one of the plurality of programmable set of instructions that is selected based on control information representative of an input received by the input device; decoding short-range wireless communication signals received from the input device via the short-range wireless connection to obtain the control information.

In example 24C, the subject matter of example 23C, may further include: encoding audio data, based on output of the one or more software programs in response to the provided set of instructions, for a transmission via a second established short-range wireless connection to an audio output device. In example 25C, the subject matter of example 23C or example 24C, can optionally include that each set of instructions includes a plurality of instructions that are configured to control one of the software programs to perform a predefined action. In example 26C, the subject matter of example 25C, providing the plurality of instructions based on a predefined order to cause the one of the software programs to perform the predefined action.

In example 27C, the subject matter of any one of examples 23C to 26C, may further include: operating in a first operation mode in which the processor is configured to establish the short-range wireless connection, establishing the interface configured to control the one or more software programs executed by the processor via the plurality of programmable set of instructions, and decode the short-range wireless communication signals; switching to the first operation mode in response to a received instruction. In example 28C, the subject matter of example 27C, may further include: causing one or more connected output devices to operate in a low power mode within the first operation mode; can optionally include that the one or more connected output devices include a display. In example 29C, the subject matter of example 27C or example 28C, may further include: establishing a further short-range wireless connection with an audio device within the first operation mode; exchanging audio data with the audio device over the established further short-range wireless connection.

In example 30C, the subject matter of any one of examples 27C to 29C, may further include: switching the operation mode of the computing device into a second operation mode; causing one or more devices to operate in a low-power mode within the second operation mode, can optionally include that the one or more devices include one or more further input devices or one or more output devices; In example 31C, the subject matter of example 30C, may further include: monitoring activity of the one or more software programs executed by the processor within the second operation mode; switching the operation mode of the computing device into the first operation mode based on the monitored activity.

In example 32C, the subject matter of example 30C or example 31C, may further include: switching the operation mode of the computing device into the second operation mode in response to at least one of a predefined control information received from the input device or a received instruction. In example 33C, the subject matter of any one of examples 30C to 32C, may further include: switching the operation mode of the computing device into a low-power mode; disconnecting the established short-range wireless connection when the computing device operates into the low-power mode. In example 34C, the subject matter of example 33C, receiving short-range wireless communication signals from the input device within the low-power mode of the computing device; waking up the computing device from the low-power mode based on a received short-range wireless communication signal.

In example 35C, the subject matter of example 34C, detecting a data sequence designated for the input device from received short-range wireless communication signals. In example 36C, the subject matter of example 34C or example 35C, can optionally include that the short-range wireless communication signals include Bluetooth communication signals; can optionally include that the method further includes scanning for advertisement packets and sending a signal representative of a detection of the input device based on a received advertisement packet may include the data sequence designated for the input device. In some examples, the subject matter of example 34C or example 35C may include that scanning, by a receiver, for beacons associated with the short-range wireless communication technology and sending a signal representative of a detection of the input device based on a received beacon. In example 37C, the subject matter of any one of examples 34C to 36C, may further include: decoding received Bluetooth communication signals. In some examples, the subject matter of any one of examples 34C to 37C, controlling operation of the short-range wireless signal receiver coupled to the processor, such that the short-range wireless signal receiver operates in a low power mode, or in a turned off mode.

In example 38C, the subject matter of example 37C, may further include: performing a low-duty cycle scanning procedure for Bluetooth low energy communication signals. In example 39C, the subject matter of example 38C, can optionally include that the low-duty cycle scanning procedure includes a duty cycle of 20%. In some examples, the subject matter of examples 34C to 37C, can optionally include that decoding received short-range wireless communication signal, and operating based on a designated low-duty cycle to scan for short-range wireless communication signals. In example 40C, the subject matter of any one of examples 34C to 39C, may further include: establishing the interface configured to control, via the plurality of programmable set of instructions, the one or more software programs executed by the processor based on an information received from the short-range wireless signal receiver.

In example 41C, the subject matter of any one of examples 34C to 40C, may further include: establishing a new connection with the input device based on the information received from the short-range wireless signal receiver. In some examples, the subject matter of any one of examples 34C to 40C, can optionally include that causing the processor to change the operating mode of the computing device based on detected signal patterns or data sequence.

In example 42C, the subject matter of any one of examples 23C to 41C, can optionally include that one of the set of instructions is to control a navigation software program to navigate the visually-impaired user to a predefined location from a current location. In example 43C, the subject matter of example 42C, can optionally include that the audio data includes audio instructions to guide the visually-impaired user from the current location to the predefined location. In example 44C, the subject matter of any one of examples 23C to 43C, can optionally include that the input device includes a braille keyboard configured to send control information via short-range wireless communication.

In example 45C, a non-transitory computer readable medium may include one or more instructions which, if executed by a processor, cause the processor to: establish a short-range wireless connection with an input device for a visually-impaired user; establish an interface configured to control, via a plurality of programmable set of instructions, one or more software programs executed by the processor, wherein the established interface is configured to control one of the one or more software programs with one of the plurality of programmable set of instructions that is selected based on control information representative of an input received by the input device; decode short-range wireless communication signals received from the input device via the short-range wireless connection to obtain the control information. In example 46C, a non-transitory computer-readable medium may include one or more instructions which, if executed by a processor, cause the processor to perform the method of any one of examples 23C to 44C.

In example 47C, a computing device may include: a processor configured to: decode data received from an input device for a visually-impaired user via an established short-range wireless connection to obtain control information; establish an interface configured to control one or more software programs executed by the processor; select, based on the obtained control information, a set of instructions from a plurality of programmable sets of instructions provided by an established interface; control, via the selected set of instructions, one or more software programs executed by the processor. In example 48C, the computing device of example 47C, can optionally include that the computing device is further configured to perform any one of aspects provided in this disclosure, in particular, the aspects provided in examples 1C to 22C.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. An apparatus for a communication device, the apparatus comprising:

a processor configured to:

obtain channel metrics for a plurality of radio communication channels, each obtained channel metric is associated with a respective radio communication channel of the plurality of radio communication channels;

generate a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric;

select one of the plurality of channel hopping sequences based on a predefined criterion to communicate with a further communication device; and wherein the processor is configured to generate the plurality of hopping sequences using a pinwheel scheduling algorithm configured to schedule the plurality of radio communication channels into the plurality of time slots.

2. The apparatus of claim 1, wherein the processor is further configured to, for an N number of the plurality of radio communication channels, generate a plurality of different repetition interval sets that are schedulable, each repetition interval set comprises N number of integers ranked in a predefined order, each integer is representative of a number of occurrences within a plurality of occurrences;

wherein the processor is further configured to generate a ranked channel set comprising information representative of the plurality of radio communication channels that are ranked in the predefined order, wherein the plurality of radio communication channels are ranked based on their respective obtained channel metrics.

3. The apparatus of claim 2, wherein the processor is further configured to generate the plurality of channel hopping sequences according to a greedy algorithm applied based on each of the plurality of different repetition interval sets and the ranked channel set.

4. The apparatus of claim 3, wherein each generated channel hopping sequence is representative of the plurality of time slots allocated for the plurality of radio communication channels, such that each radio communication channel is allocated to the number of time slots that is based on a respective integer of a respective repetition interval set.

5. The apparatus of claim 3, wherein the processor is further configured to obtain a candidate channel hopping sequence according to the greedy algorithm applied based on one of the plurality of different interval sets and the ranked channel set;

wherein the processor is further configured to remap at least one of the time slots from a first radio communication channel of the plurality of radio communication channels to a second radio communication channel of the plurality of radio communication channels of the candidate channel hopping sequence based on the obtained channel metric associated with the first radio communication channel and the second communication channel.

6. The apparatus of claim 3, wherein the processor is further configured to determine to remap the at least one of the time slots based on the obtained channel metric associated with the respective radio communication channel allocated for the at least one of the time slot and a predetermined channel metric threshold.

7. The apparatus of claim 1, wherein the selected channel hopping sequence is configured to cause the communication device to use respective radio communication channels at respective time slots to communicate with the further communication device.

8. The apparatus of claim 1, wherein the predefined criterion is based on calculated entropies for each generated channel hopping sequence.

9. The apparatus of claim 1, wherein the predefined criterion is based on estimated throughputs for each generated channel hopping sequence.

10. The apparatus of claim 9, wherein the predefined criterion is based on a weighed combination of a first metric associated with a calculated entropy and a second metric associated with an estimated throughput for each generated channel hopping sequence.

11. The apparatus of claim 1, wherein each obtained channel metric associated with the respective radio communication channel is based on at least one channel measurements comprising any of a signal to noise ratio, a received signal strength indicator (RSSI), a packet error rate (PER), a bit error rate (BER), a presence of radio communication channels associated with other radio access technologies, an estimated network traffic classification, a quality of service (QoS) metric, or a measurement reports received from other communication devices.

12. The apparatus of claim 1, wherein the plurality of radio communication channels are communication channels according to a protocol of the Bluetooth Special Interest Group.

13. A non-transitory computer-readable medium comprising one or more instructions which, if executed by a processor, cause the processor to:

obtain channel metrics for a plurality of radio communication channels, each obtained channel metric is associated with a respective radio communication channel of the plurality of radio communication channels;

generate a plurality of channel hopping sequences, each channel hopping sequence is representative of an allocation of the plurality of radio communication channels for a plurality of time slots, wherein a number of time slots allocated for each radio communication channel within each channel hopping sequence is based on the respective obtained channel metric;

select one of the plurality of channel hopping sequences based on a predefined criterion to communicate with a further communication device; and wherein the instructions causing the processor to generate the plurality of hopping sequences using a pinwheel scheduling algorithm configured to schedule the plurality of radio communication channels into the plurality of time slots.

14. The non-transitory computer-readable medium of claim 13, wherein the selected channel hopping sequence is configured to cause a communication device including the processor to use respective radio communication channels at respective time slots to communicate with the further communication device.

15. A method, comprising:

obtaining channel metrics for a plurality of radio communication channels, each obtained channel metric being associated with a respective radio communication channel of the plurality of radio communication channels;

generating a plurality of channel hopping sequences, each channel hopping sequence being representative of an allocation of the plurality of radio communication channels for a plurality of time slots, wherein a number of time slots allocated for each radio communication channel within each channel hopping sequence is based on the respective obtained channel metric; and selecting one of the plurality of channel hopping sequences based on a predefined criterion to communicate with a further communication device; and further comprising generating the plurality of hopping sequences using a pinwheel scheduling algorithm configured to schedule the plurality of radio communication channels into the plurality of time slots.

16. The method of claim 15, further comprising:

causing, according to the selected channel hopping sequence, a communication device to use respective radio communication channels at respective time slots to communicate with the further communication device.

17. The method of claim 15, wherein the predefined criterion is based on calculated entropies for each generated channel hopping sequence.

18. The method of claim 15, wherein the predefined criterion is based on estimated throughputs for each generated channel hopping sequence.

19. The method of claim 15, wherein the predefined criterion is based on a weighed combination of a first metric associated with a calculated entropy and a second metric associated with an estimated throughput for each generated channel hopping sequence.

* * * * *